United States Patent
Ku et al.

(10) Patent No.: US 6,553,030 B2
(45) Date of Patent: Apr. 22, 2003

(54) TECHNIQUE FOR FORWARDING MULTI-CAST DATA PACKETS

(75) Inventors: Ed Ku, Saratoga, CA (US); Piyush Kothary, San Jose, CA (US); Ramesh Yarlagadda, French Camp, CA (US); Sreenivas Kottapalli, Milpitas, CA (US); Carl Gyllenhammer, Scotts Valley, CA (US)

(73) Assignee: Maple Optical Systems Inc., San Jose, CA (US)

( * ) Notice: Subject to any disclaimer, the term of this patent is extended or adjusted under 35 U.S.C. 154(b) by 0 days.

(21) Appl. No.: 09/974,246

(22) Filed: Oct. 9, 2001

(65) Prior Publication Data
US 2002/0085553 A1 Jul. 4, 2002

Related U.S. Application Data
(60) Provisional application No. 60/259,161, filed on Dec. 28, 2000.

(51) Int. Cl.$^7$ .................. H04L 12/28; H04L 12/56
(52) U.S. Cl. ............................................. 370/390
(58) Field of Search .................... 370/389, 390, 370/392, 412–418

(56) References Cited

U.S. PATENT DOCUMENTS

| | | | |
|---|---|---|---|
| 5,555,243 A | 9/1996 | Kakuma et al. | 370/58.2 |
| 5,684,800 A | 11/1997 | Dobbins et al. | 370/401 |
| 5,689,506 A | 11/1997 | Chiussi et al. | 370/388 |
| 5,748,629 A | 5/1998 | Caldara et al. | 370/389 |
| 5,784,003 A * | 7/1998 | Dahlgren | 340/2.2 |
| 5,790,522 A | 8/1998 | Fichou et al. | 370/236 |
| 5,841,771 A | 11/1998 | Irwin et al. | 370/360 |
| 5,898,668 A | 4/1999 | Shaffer | 370/230 |
| 5,996,019 A | 11/1999 | Hauser et al. | 709/235 |
| 5,999,531 A * | 12/1999 | Ferolito et al. | 370/390 |
| 6,115,379 A | 9/2000 | Flanders et al. | 370/392 |
| 6,151,301 A | 11/2000 | Holden | 370/232 |
| 6,175,875 B1 | 1/2001 | Stapleton et al. | 709/250 |
| 6,292,492 B1 | 9/2001 | Bonomi et al. | 370/415 |
| 2001/0012296 A1 * | 8/2001 | Burgess et al. | 370/392 |

OTHER PUBLICATIONS

Davie, Bruce and Yakov Rekhter, *MPLS: Technology and Applications*, Morgan Kaufmann Publishers, 2000.

* cited by examiner

Primary Examiner—Dang Ton
Assistant Examiner—Kevin C. Harper
(74) *Attorney, Agent, or Firm*—David R. Stevens

(57) ABSTRACT

A technique for forwarding multi-cast data packets in a communication network. Multi-cast packets are broadcast to every output port of the switch. The packet is thus buffered in each port. Then, all of the output ports, save those that are appropriate output ports for the packet, drop the packet. Accordingly, the output ports that did not drop the packet forward the packet to the network. A control packet that follows the packet may then instruct the ports regarding which ports are to drop the packet and which ports are to forward the packet. This technique has an advantage of efficiently handling multi-cast packets.

26 Claims, 15 Drawing Sheets

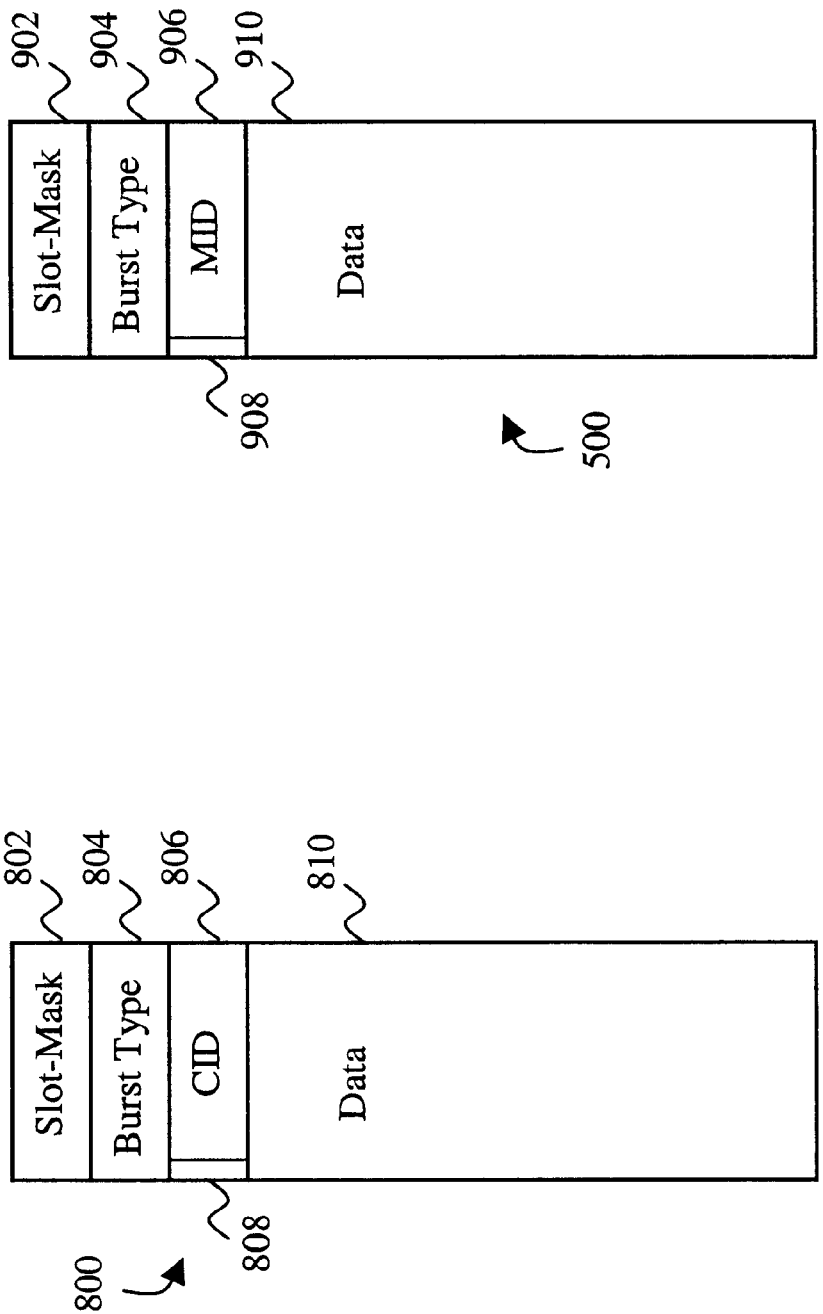

TECHNIQUE FOR FORWARDING MULTI-CAST DATA PACKETS

RELATED APPLICATIONS

This application claims the benefit of U.S. Provisional Application Serial No. 60/259,161, filed Dec. 28, 2000.

The contents of U.S. patent application Ser. No. 09/974,134, filed on the same day as this application, and entitled, "METRO SWITCH AND METHOD FOR TRANSPORTING DATA CONFIGURED ACCORDING TO MULTIPLE DIFFERENT FORMATS"; U.S. patent application Ser. No. 09/974,244, filed on the same day as this application, and entitled, "NON-BLOCKING VIRTUAL SWITCH ARCHITECTURE"; U.S. patent application Ser. No. 09/974,163, filed on the same day as this application, and entitled, "QUALITY OF SERVICE TECHNIQUE FOR A DATA COMMUNICATION NETWORK"; U.S. patent application Ser. No. 09/974,247, filed on the same day as this application, and entitled, "TECHNIQUE FOR TIME DIVISION MULTIPLEX FORWARDING OF DATA STREAMS"; and U.S. patent application Ser. No. 09/974,549, filed on the same day as this application, and entitled, "ADDRESS LEARNING TECHNIQUE IN A DATA COMMUNICATION NETWORK" are hereby incorporated by reference.

FIELD OF THE INVENTION

The invention relates to a method and apparatus for data communication in a network.

BACKGROUND OF THE INVENTION

Conventionally, integrating different network protocols or media types is complex and difficult. Routers and gateways may be used for protocol conversion and for managing quality of services. However, these techniques and devices tend to be complex, resource intensive, difficult and time consuming to implement and slow in operation.

In conventional high speed networks, data is typically transmitted in a single format, e.g., ATM, frame relay, PPP, Ethernet, etc. Each of these various types of formats generally requires dedicated hardware and communication paths along which to transmit the data. The principle reason for this is that the communication protocols and signaling techniques tend to be different for each format. For example, in a transmission using an ATM format, data cells are sent from a source to a destination along a predetermined path. Headers are included with each cell for identifying the cell as belonging to a set of associated data. In such a transmission, the size of the data cell being sent is known, as well as the beginning and end of the cell. In operation, cells are sent out, sometimes asynchronously, for eventual reassembly with the other associated data cells of the set at a destination. Idle times may occur between transmissions of data cells.

For a frame relay format, communications are arranged as data frames. Data is sent sometimes asynchronously for eventual reassembly with other associated data packets at a destination. Idle time may occur between the transmissions of individual frames of data. The transmission and assembly of frame relay data, however, is very different from that of ATM transmissions. For example, the frame structures differ as well as the manner in which data is routed to its destination.

Some network systems require that connections be set up for each communication session and then be taken down once the session is over. This makes such systems generally incompatible with those in which the data is routed as discrete packets. A Time Division Multiplex (TDM) system, for example, requires the setting up of a communication session to transmit data. While a communication session is active, there is no time that the communication media can be considered idle, unlike the idle periods that occur between packets in a packet-based network. Thus, sharing transmission media is generally not possible in conventional systems. An example of this type of protocol is "Point-to-Point Protocol" (PPP). Internet Protocol (IP) is used in conjunction with PPP in manner known as IP over PPP to forward IP packets between workstations in client-server networks.

It would be useful to provide a network system that allows data of various different formats to be transmitted from sources to destinations within the same network and to share transmission media among these different formats.

As mentioned, some network systems provide for communication sessions. This scheme works well for long or continuous streams of data, such as streaming video data or voice signal data generated during real-time telephone conversations. However, other network systems send discrete data packets that may be temporarily stored and forwarded during transmission. This scheme works well for communications that are tolerant to transmission latency, such as copying computer data files from one computer system to another. Due to these differences in network systems and types of data each is best suited for, no one network system is generally efficient and capable of efficiently handling mixed streams of data and discrete data packets.

Therefore, what is needed is a network system that efficiently handles both streams of data and discrete data packets.

Further, within conventional network systems, data packets are received at an input port of a multi-port switch and are then directed to an appropriate output port based upon the location of the intended recipient for the packet. Within the switch, connections between the input and output ports are typically made by a crossbar switch array. The crossbar array allows packets to be directed from any input port to any output port by making a temporary, switched connection between the ports. However, while such a connection is made and the packet is traversing the crossbar array, the switch is occupied. Accordingly, other packets arriving at the switch are blocked from traversing the crossbar. Rather, such incoming packets must be queued at the input ports until the crossbar array becomes available.

Accordingly, the crossbar array limits the amount of traffic that a typical multi-port switch can handle. During periods of heavy network traffic, the crossbar array becomes a bottleneck, causing the switch to become congested and packets lost by overrunning the input buffers.

An alternate technique, referred to as cell switching, is similar except that packets are broken into smaller portions called cells. The cells traverse the crossbar array individually and then the original packets are reconstructed from the cells. The cells, however, must be queued at the input ports while each waits its turn to traverse the switch. Accordingly, cell switching also suffers from the drawback that the crossbar array can become a bottleneck during periods of heavy traffic.

Another technique, which is a form of time-division multiplexing, involves allocating time slots to the input ports in a repeating sequence. Each port makes use of the crossbar array during its assigned time slots to transmit entire data packets or portions of data packets. Accordingly, this approach also has the drawback that the crossbar array can become a bottleneck during periods of heavy traffic. In addition, if a port does not have any data packets queued for transmission when its assigned time slot arrives, the time slot is wasted as no data may be transmitted during that time slot.

Therefore, what is needed is a technique for transmitting data packets in a multi-port switch that does not suffer from the afore-mentioned drawbacks. More particularly, what is needed is such a technique that avoids a crossbar array from becoming a traffic bottleneck during periods of heavy network traffic.

Under certain circumstances, it is desirable to send the same data to multiple destinations in a network. Data packets sent in this manner are conventionally referred to as multi-cast data. Thus, network systems must often handle both data intended for a single destination (conventionally referred to as uni-cast data) and multi-cast data. Data is conventionally multi-cast by a multi-port switch repeatedly sending the same data to all of the destinations for the data. Such a technique can be inefficient due to its repetitiveness and can slow down the network by occupying the switch for relatively long periods while multi-casting the data.

Therefore, what is needed is an improved technique for handling both uni-cast and multi-cast data traffic in a network system.

Certain network protocols require that switching equipment discover aspects of the network configuration in order to route data traffic appropriately (this discovery process is sometimes referred to as "learning"). For example, an Ethernet data packet includes a MAC source address and a MAC destination address. The source address uniquely identifies a particular piece of equipment in the network (i.e. a network "node") as the originator of the packet. The destination address uniquely identifies the intended recipient node (sometimes referred to as the "destination node"). Typically, the MAC address of a network node is programmed into the equipment at the time of its manufacture. For this purpose, each manufacturer of network equipment is assigned a predetermined range of addresses. The manufacturer then applies those addresses to its products such that no two pieces of network equipment share an identical MAC address.

A conventional Ethernet switch must learn the MAC addresses of the nodes in the network and the locations of the nodes relative to the switch so that the switch can appropriately direct packets to them. This is typically accomplished in the following manner: when the Ethernet switch receives a packet via one of its input ports, it creates an entry in a look-up table. This entry includes the MAC source address from the packet and an identification of the port of the switch by which the packet was received. Then, the switch looks up the MAC destination address included in the packet in this same look-up table. This technique is suitable for a local area network (LAN). However, where a wide area network (WAN) interconnects LANs, a distributed address table is required as well as learning algorithms to create and maintain the distributed table.

SUMMARY OF THE INVENTION

The invention is a technique for forwarding multi-cast data packets in a communication network. Multi-cast packets are broadcast to every output port of the switch. The packet is thus buffered in each port. Then, all of the output ports, save those that are appropriate output ports for the packet, drop the packet. Accordingly, the output ports that did not drop the packet forward the packet to the network. A control packet that follows the packet may then instruct the ports regarding which ports are to drop the packet and which ports are to forward the packet. This technique has an advantage of efficiently handling multi-cast packets.

In one aspect, a method of forwarding data packets in a multi-port switch having input ports for receiving data packets to be forwarded by the switch and output ports for forwarding the data packets is provided. A data packet is received by an input port. Copies of the data packet are passed to each of a plurality of output ports including at least one output port that is not an appropriate output port for forwarding the packet. One or more masks for the packet are formed, each mask being a binary value having a first logic value in each bit position that corresponds to appropriate output port for forwarding the packet and a second logic value in remaining bit positions. The data packet is forwarded by each appropriate output port indicated by the one or more masks.

The mask for a uni-cast packet may have the first logic value in a bit position that corresponds to one appropriate output port for forwarding the packet and a second logic value in the remaining bit positions. The mask for a multi-cast packet may have the first logic value in bit positions that correspond to a plurality of appropriate output ports for forwarding the packet and the second logic value in the remaining bit positions. The copy of the data packet may be dropped by each of the plurality of output ports that is not an appropriate output port for forwarding the data packet after said passing. The data packet may be forwarded by multiple output ports in substantially the same format. A plurality of the masks may be formed. The data packet may be forwarded in a different format for each of multiple output ports.

The mask may be included in a destination vector for the packet, wherein the destination vector indicates whether the packet is to be forwarded according to multiple different formats. The destination vector may be looked up in a look-up table of the multi-port switch. A command packet may be formed when the data packet is to be forwarded according to multiple different formats. The command packet may include indicia of the format for the data packet for each appropriate output port for forwarding the data packet. The command packet may include the one or more masks for the packet. The command packet may include an additional mask having the first logic value in all bit positions.

In another aspect, a method of forwarding data packets in a multi-port switch having input ports for receiving data packets to be forwarded by the switch and output ports for forwarding the data packets is provided. A data packet is received by an input port. Copies of the data packet are passed to each of a plurality of output ports including at least one output port that is not an appropriate output port for forwarding the packet. A determination is made as to whether the data packet is multi-cast or uni-cast. When the packet is uni-cast, a uni-cast mask is formed for the packet, the uni-cast mask being a binary value having first logic value in a bit position that corresponds to an appropriate output port for forwarding the packet and a second logic value in remaining bit positions. When the packet is multi-cast, a plurality of multi-cast masks are formed for the packet, each multi-cast mask being a binary value having the first logic value in a bit position that corresponds to an appropriate output port for forwarding the packet.

The data packet may be forwarding by the destination ports indicated by the one of the uni-cast or mult-cast masks.

The copy of the data packet may be dropped by each of the plurality of output ports that is not an appropriate output port for forwarding the data packet after the copies are passed. When the data packet is multi-cast, an appropriate format of the data packet may be determined for each multi-cast mask. The data packet may be formatted in accordance with each of the appropriate formats thereby forming a plurality of formatted multi-cast packets. The formatted multi-cast packets may then be forwarded. A multi-cast identification list may be formed having a number of entries corresponding to the number of output ports that are to forward the data packet, each entry including an identification of a output port and an indication of an appropriate format for the data packet. The multi-cast masks may be formed based on the output port identifications.

In a further aspect, a method of forwarding data packets in a multi-port switch having input ports for receiving data packets to be forwarded by the switch and output ports for forwarding the data packets is provided. A data packet is received by an input port.

Copies of the data packet are passed to each of a plurality of output ports. One or more masks is formed for the packet, each mask being a binary value having a first logic value in one or more bit positions that correspond to appropriate output ports for forwarding the packet and a second logic value in the remaining bit positions. An appropriate format of the data packet is determined for each of the appropriate output ports. The data packet is formatted in accordance with each of the appropriate formats thereby forming a plurality of formatted multi-cast packets. The formatted multi-cast packets are forwarded. The copy of the data packet may be dropped by each output port that is not an appropriate output port for forwarding the data packet after said passing.

In still another aspect, a method of forwarding data packets in a multi-port switch having input ports for receiving data packets to be forwarded by the switch and output ports for forwarding the data packets is provided. A data packet is received by an input port. A first mask is formed when the packet is multi-cast, the first mask being a binary value having a first logic value in all bit positions. Copies of the data packet are passed to each output port indicated by the first mask, including at least one output port that is not an appropriate output port for forwarding the packet. One or more multi-cast masks are formed for the packet, each multi-cast mask being a binary value having a first logic value in each bit position that corresponds to appropriate output port for forwarding the packet and a second logic value in remaining bit positions. The data packet is forwarded by each appropriate output port indicated by the one or more multi-cast masks.

A determination may be made as to whether the packet is uni-cast or multi-cast. When the packet is uni-cast, a uni-cast mask may be formed, the uni-cast mask being a binary value having a first logic value each bit position that corresponds to appropriate output port for forwarding the packet. The uni-cast mask may have one occurrence of the first logic value or a plurality of occurrences of the first logic value. The uni-cast mask may be appended to the packet. The first mask may be appended to the data packet.

BRIEF DESCRIPTION OF THE DRAWINGS

FIG. 8 illustrates a uni-cast packet prepared for delivery to the queuing engines of FIG. 6;

FIG. 9 illustrates a multi-cast packet prepared for delivery to the queuing engines of FIG. 6;

DETAILED DESCRIPTION OF A PREFERRED EMBODIMENT

Figure 1:
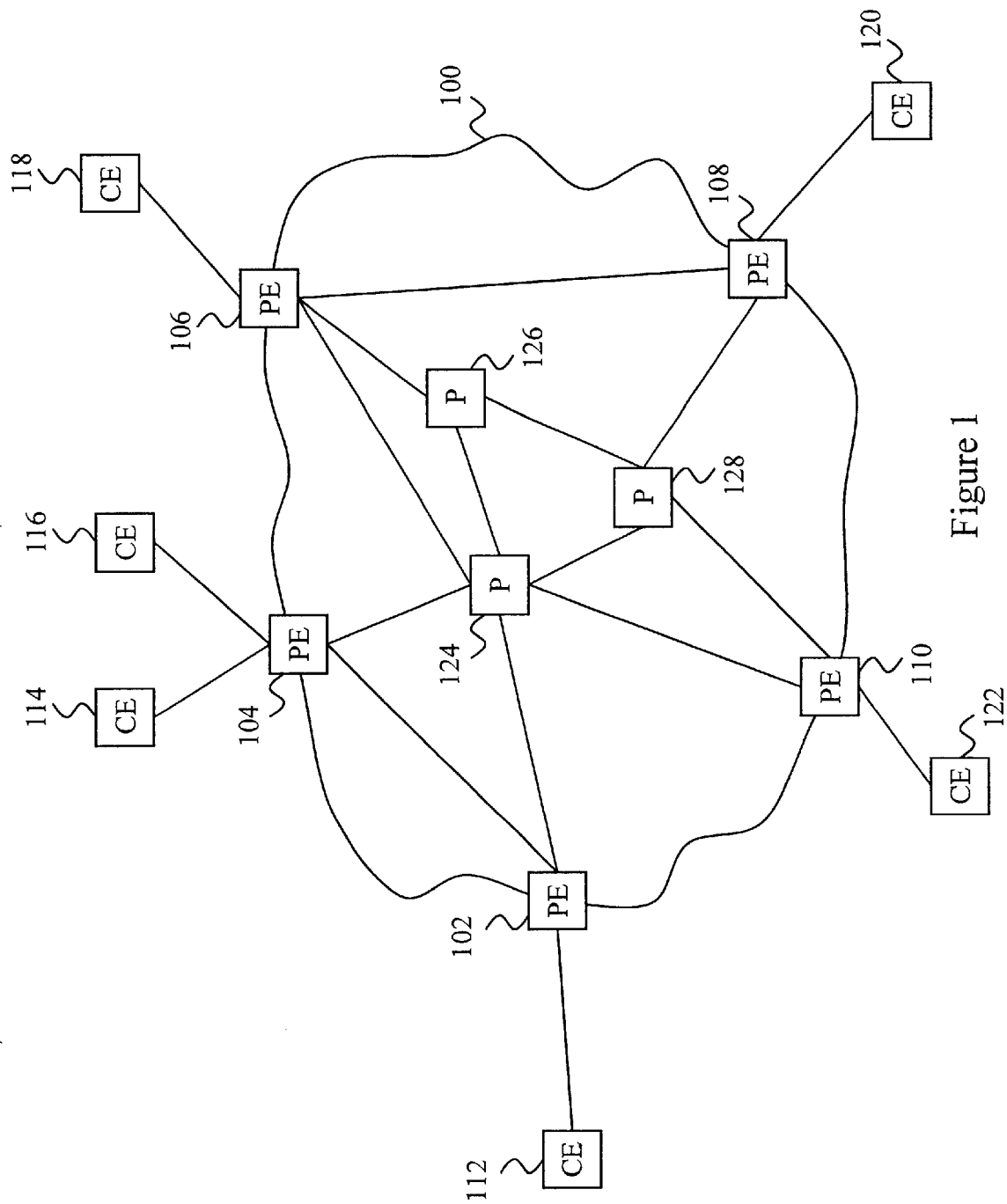
FIG. 1 illustrates a block schematic diagram of a network domain in accordance with the present invention.

FIG. 1 illustrates a block schematic diagram of a network domain (also referred to as a network "cloud") 100 in accordance with the present invention. The network 100 includes edge equipment (also referred to as provider equipment or, simply, "PE") 102, 104, 106, 108, 110 located at the periphery of the domain 100. Edge equipment 102–110 each communicate with corresponding ones of external equipment (also referred to as customer equipment or, simply, "CE") 112, 114, 116, 118, 120 and 122 and may also communicate with each other via network links. As shown in FIG. 1, for example, edge equipment 102 is coupled to external equipment 112 and to edge equipment 104. Edge equipment 104 is also coupled to external equipment 114 and 116. In addition, edge equipment 106 is coupled to external equipment 118 and to edge equipment 108, while edge equipment 108 is also coupled to external equipment 120. And, edge equipment 110 is coupled to external equipment 122.

The external equipment 112–122 may include equipment of various local area networks (LANs) that operate in accordance with any of a variety of network communication protocols, topologies and standards (e.g., PPP, Frame Relay, Ethernet, ATM, TCP/IP, token ring, etc.). Edge equipment 102–110 provide an interface between the various protocols utilized by the external equipment 112–122 and protocols utilized within the domain 100. In one embodiment, communication among network entities within the domain 100 is performed over fiber-optic links and accordance with a high-bandwidth capable protocol, such as Synchronous Optical NETwork (SONET) or Ethernet (e.g., Gigabit or 10 Gigabit). In addition, a unified, label-switching (sometimes referred to as "label-swapping") protocol, for example, multi-protocol label switching (MPLS), is preferably utilized for directing data throughout the network 100.

Internal to the network domain 100 are a number of network switches (also referred to as provider switches, provider routers or, simply, "P") 124, 126 and 128. The switches 124–128 serve to relay and route data traffic among the edge equipment 102–110 and other switches. Accordingly, the switches 124–128 may each include a plurality of ports, each of which may be coupled via network links to another one of the switches 124–128 or to the edge equipment 102–110. As shown in FIG. 1, for example, the switches 124–128 are coupled to each other. In addition, the switch 124 is coupled to edge equipment 102, 104, 106 and 110. The switch 126 is coupled to edge equipment 106, while the switch 128 is coupled to edge equipment 108 and 110.

It will be apparent that the particular topology of the network 100 and external equipment 112–122 illustrated in FIG. 1 is exemplary and that other topologies may be utilized. For example, more or fewer external equipment, edge equipment or switches may be provided. In addition, the elements of FIG. 1 may be interconnected in various different ways.

The scale of the network 100 may vary as well. For example, the various elements of FIG. 1 may be located within a few feet or each other or may be located hundreds of miles apart. Advantages of the invention, however, may be best exploited in a network having a scale on the order of hundreds of miles. This is because the network 100 may facilitate communications among customer equipment that uses various different protocols and over great distances. For example, a first entity may utilize the network 100 to communicate among: a first facility located in San Jose, Calif.; a second facility located in Austin, Tex.; and third facility located in Chicago, Ill. A second entity may utilize the same network 100 to communicate between a headquarters located in Buffalo, N.Y. and a supplier located in Salt Lake City, Utah. Further, these entities may use various different network equipment and protocols. Note that long-haul links may also be included in the network 100 to facilitate, for example, international communications.

The network 100 may be configured to provide allocated bandwidth to different user entities. For example, the first entity mentioned above may need to communicate a larger amount of data between its facilities than the second entity mentioned above. In which case, the first entity may purchase from a service provider a greater bandwidth allocation than the second entity. For example, bandwidth may be allocated to the user entity by assigning various channels (e.g., OC-3, OC-12, OC-48 or OC-192 channels) within SONET STS-1 frames that are communicated among the various locations in the network 100 of the user entity's facilities.

Figure 2:
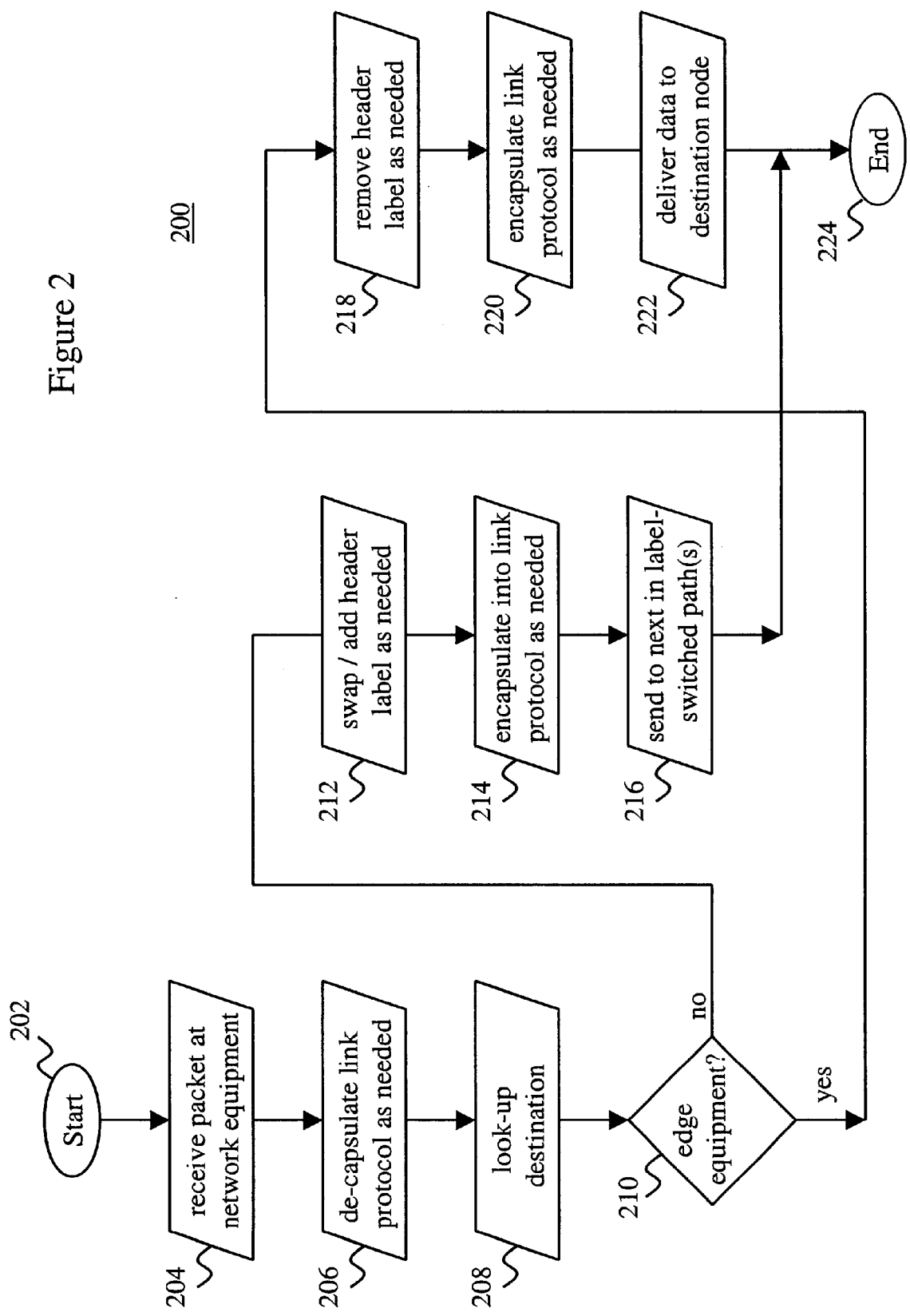
FIG. 2 illustrates a flow diagram for a packet traversing the network of FIG. 1.

FIG. 2 illustrates a flow diagram 200 for a packet traversing the network 100 of FIG. 1. Program flow begins in a start state 202. From the state 202, program flow moves to a state 204 where a packet or other data is received by equipment of the network 100. Generally, a packet transmitted by a piece of external equipment 112–122 (FIG. 1) is received by one of the edge equipment 102–110 (FIG. 1) of the network 100. For example, a data packet may be transmitted from customer equipment 112 to edge equipment 102. This packet may be accordance with any of a number of different network protocols, such as Ethernet, Asynchronous Transfer Mode (ATM), Point-to-Point Protocol (PPP), frame relay, Internet Protocol (IP) family, token ring, time-division multiplex (TDM), etc.

Once the packet is received in the state 204, program flow moves to a state 206. In the state 206, the packet may be de-capsulated from a protocol used to transmit the packet. For example, a packet received from external equipment 112 may have been encapsulated according to Ethernet, ATM or TCP/IP prior to transmission to the edge equipment 102. From the state 206, program flow moves to a state 208.

In the state 208, information regarding the intended destination for the packet, such as a destination address or key, may be retrieved from the packet. The destination data may then be looked up in a forwarding database at the network equipment that received the packet. From the state 208, program flow moves to a state 210.

In the state 210, based on the results of the look-up performed in the state 208, a determination is made as to whether the equipment of the network 100 that last received the packet (e.g., the edge equipment 102) is the destination for the packet or whether one or more hops within the network 100 are required to reach the destination. Generally, edge equipment that receives a packet from external equipment will not be a destination for the data. Rather, in such a situation, the packet may be delivered to its destination node by the external equipment without requiring services of the network 100. In which case, the packet may be filtered by the edge equipment 112–120. Assuming that one or more hops are required, then program flow moves to a state 212.

In the state 212, the network equipment (e.g., edge equipment 102) determines an appropriate label switched path (LSP) for the packet that will route the packet to its intended recipient. For this purpose, a number of LSPs may have previously been set up in the network 100. Alternately, a new LSP may be set up in the state 212. The LSP may be selected based in part upon the intended recipient for the packet. A label obtained from the forwarding database may then be appended to the packet to identify a next hop in the LSP.

Figure 3:
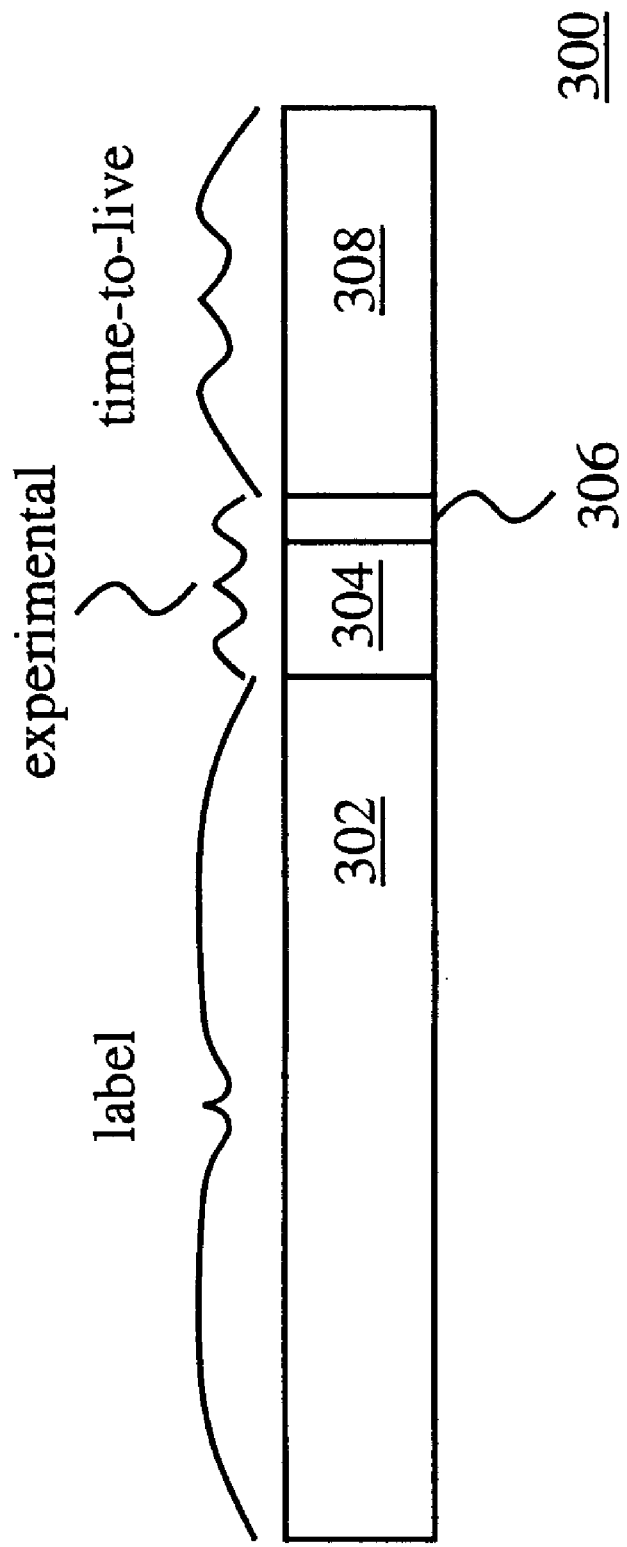
FIG. 3 illustrates a packet label that can be used for packet label switching in the network of FIG. 1.

FIG. 3 illustrates a packet label header 300 that can be appended to data packets for label switching in the network of FIG. 1. The header 300 preferably complies with the MPLS standard for compatibility with other MPLS-configured equipment. However, the header 300 may include modifications that depart from the MPLS standard. As shown in FIG. 3, the header 300 includes a label 302 that may identify a next hop along an LSP. In addition, the header 300 preferably includes a priority value 304 to indicate a relative priority for the associated data packet so that packet scheduling may be performed. As the packet traverses the network 100, additional labels may be added or removed in a layered fashion. Thus, the header 300 may include a last label stack flag 306 (also known as an "S" bit) to indicate whether the header 300 is the last label in a layered stack of labels appended to a packet or whether one or more other headers are beneath the header 300 in the stack. In one embodiment, the priority 304 and last label flag 306 are located in a field designated by the MPLS standard as "experimental."

Further, the header 300 may include a time-to-live (TTL) value 308 for the label 302. For example, the TTL value may be set to an initial values that is decremented each time the packet traverses a next hop in the network. When the TTL value reaches "1" or zero, this indicates that the packet should not be forwarded any longer. Thus, the TTL value can be used to prevent packets from repeatedly traversing any loops which may occur in the network 100.

Figure 4:
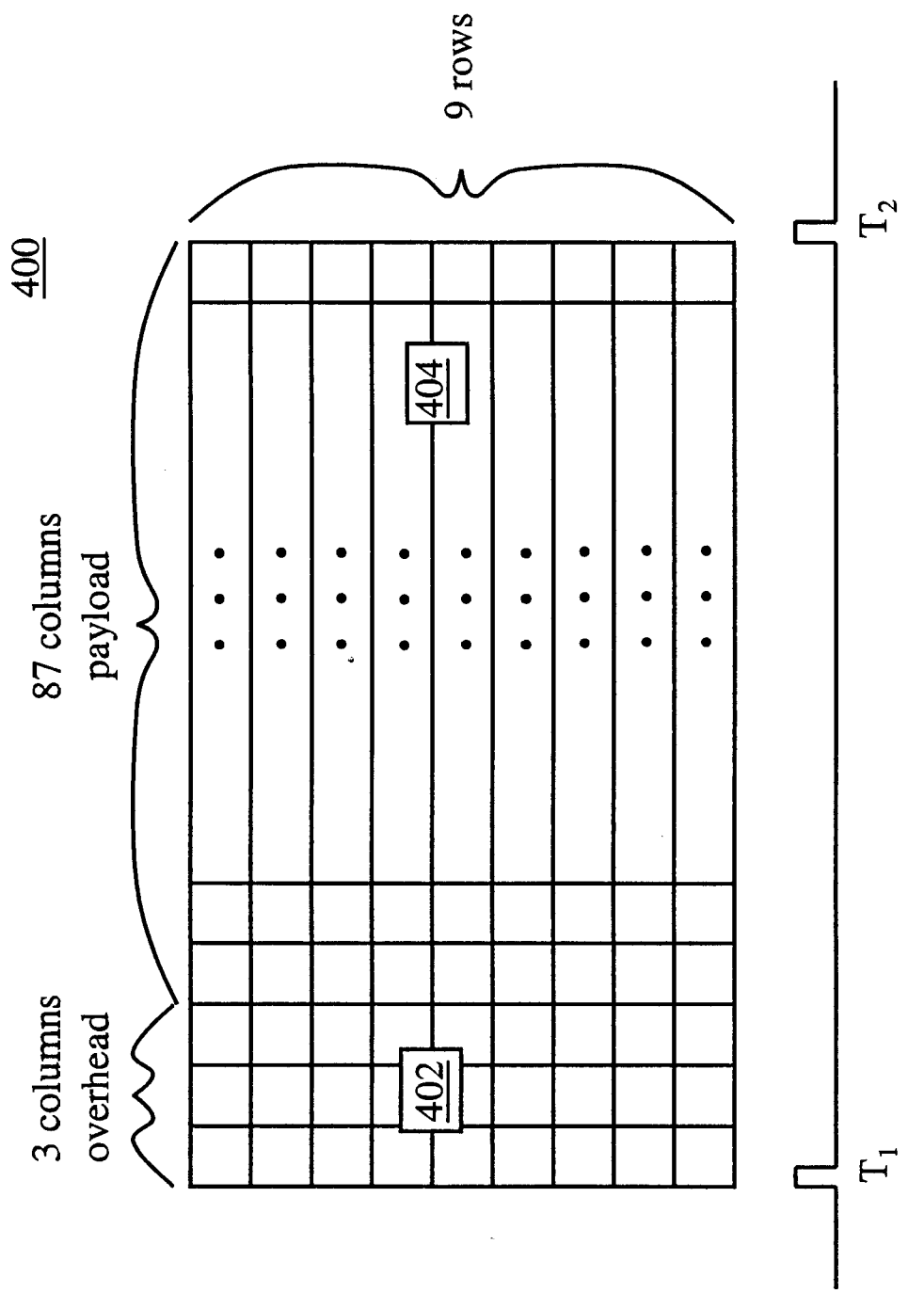
FIG. 4 illustrates a data frame structure for encapsulating data packets to be communicated in the network of FIG. 1.

From the state 212, program flow moves to a state 214 where the labeled packet may then be further converted into a format that is suitable for transmission via the links of the network 100. For example, the packet may be encapsulated into a data frame structure, such as a SONET frame or an Ethernet (Gigabit or 10 Gigabit) frame. FIG. 4 illustrates a data frame structure 400 that may be used for encapsulating data packets to be communicated via the links of the network of FIG. 1. As shown in FIG. 4, an exemplary SONET frame 400 is arranged into nine rows and 90 columns. The first three columns 402 are designated for overhead information while the remaining 87 columns are reserved for data. It will be apparent, however, that a format other than SONET may be used for the frames. Frames, such as the frame 400, may be transmitted via links in the network 100 (FIG. 1) one after the other at regular intervals, as shown in FIG. 4 by the start of frame times $T_1$ and $T_2$. As mentioned, portions (i.e. channels) of each frame 400 are preferably reserved for various LSPs in the network 100. Thus, various LSPs can be provided in the network 100 to user entities, each with an allocated amount of bandwidth.

Thus, in the state 214, the data received by the network equipment (e.g., edge equipment 102) may be inserted into an appropriate allocated channel in the frame 400 (FIG. 4) along with its label header 300 (FIG. 3) and link header. The link header aids in recovery of the data from the frame 400 upon reception. From the state 214, program flow moves to a state 216, where the packet is communicated within the frame 400 along a next hop of the appropriate LSP in the network 100. For example, the frame 400 may be transmitted from the edge equipment 102 (FIG. 1) to the switch 124 (FIG. 1). Program flow for the current hop along the packet's path may then terminate in a state 224.

Program flow may begin again at the start state 202 for the next network equipment in the path for the data packet. Thus, program flow returns to the state 204. In the state 204, the packet is received by equipment of the network 100. For the second occurrence of the state 204 for a packet, the network equipment may be one of the switches 124–128. For example, the packet may be received by switch 124 (FIG. 1) from edge equipment 102 (FIG. 1). In the second occurrence of the state 206, the packet may be de-capsulated from the protocol (e.g., SONET) used for links within the network 100 (FIG. 1). Thus, in the state 206, the packet and its label header may be retrieved from the data portion 404 (FIG. 4) of the frame 400. In the state 212, the equipment (e.g., the switch 124) may swap a present label 302 (FIG. 3) with a label for the next hop in the network 100. Alternately, a label may be added, depending upon the label value 302 (FIG. 3) for the label header 300 (FIG. 3) and/or the initialization state of an egress port or channel of the equipment by which the packet is forwarded.

This process of program flow moving among the states 204–216 and passing the data from node to node continues until the equipment of the network 100 that receives the packet is a destination in the network 100, such as edge equipment 102–110. Then, assuming that in the state 210 it is determined that the data has reached a destination in the network 100 (FIG. 1) such that no further hops are required, then program flow moves to a state 218. In the state 218, the label header 300 (FIG. 3) may be removed. Then, as needed in a state 220, the packet may be encapsulated into a protocol appropriate for delivery to its destination in the customer equipment 112–122. For example, if the destination expects the packet to have Ethernet, ATM or TCP/IP encapsulation, the appropriate encapsulation may be added in the state 220.

Then, in a state 222, the packet or other data may be forwarded to external equipment in its original format. For example, assuming that the packet sent by customer equipment 112 was intended for customer equipment 118, the edge equipment 106 may remove the label header from the packet (state 218), encapsulate it appropriately (state 220) and forward the packet to the customer equipment 118 (state 222). Program flow may then terminate in a state 224.

Thus, a network system has been described in which label switching (e.g., MPLS protocol) may be used in conjunction with a link protocol (e.g., PPP over SONET) in a novel manner to allow disparate network equipment the ability to communicate via a shared network resources (e.g., the equipment and links of the network 100 of FIG. 1).

Figure 5:
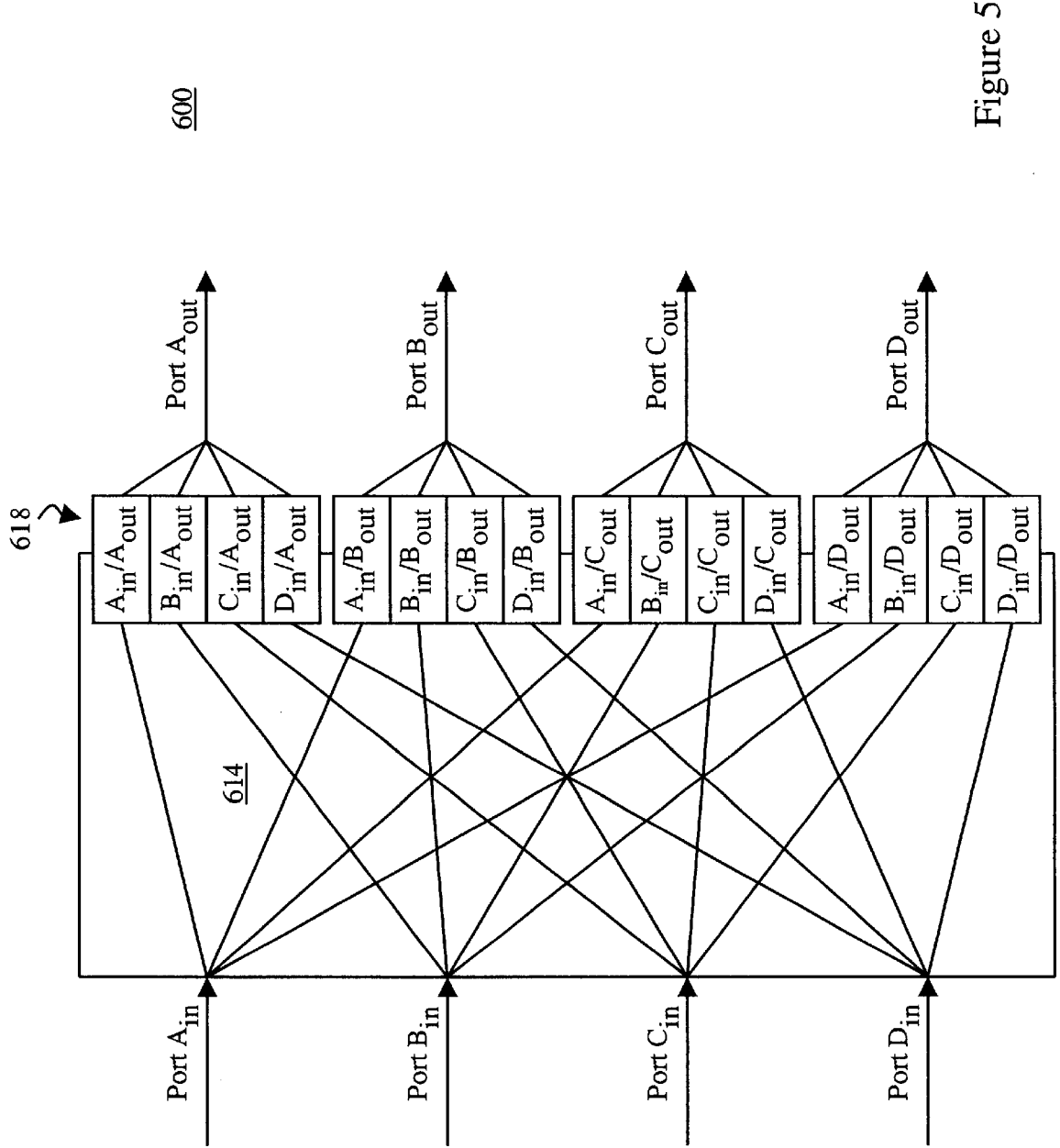
FIG. 5 illustrates a block schematic diagram of a switch of FIG. 1 showing a plurality of buffers for each port.

In another aspect of the invention, a non-blocking switch architecture is provided. FIG. 5 illustrates a block schematic diagram of a switch 600 showing a plurality of buffers 618 for each of several ports. A duplicate of the switch 600 may be utilized as any of the switches 124, 126 and 128 or edge equipment 102–110 of FIG. 1. Referring to FIG. 5, the switch 600 includes a plurality of input ports $A_{in}$, $B_{in}$, $C_{in}$ and $D_{in}$ and a plurality of output ports $A_{out}$, $B_{out}$, $C_{out}$ and $D_{out}$. In addition, the switch 600 includes a plurality of packet buffers 618.

Each of the input ports $A_{in}$, $B_{in}$, $C_{in}$ and $D_{in}$ is coupled to each of the output ports $A_{out}$, $B_{out}$, $C_{out}$ and $D_{out}$ via distribution channels 614 and via one of the buffers 618. For example, the input port $A_{in}$ is coupled to the output port $A_{out}$ via a buffer designated "$A_{in}/A_{out}$". As another example, the input port $B_{in}$ is coupled to the output port $C_{out}$ via a buffer designated "$B_{in}/C_{out}$". As still another example, the input port $D_{in}$ is coupled to the output port $D_{out}$ via a buffer designated "$D_{in}/D_{out}$". Thus, the number of buffers provided for each output port is equal to the number of input ports. Each buffer may be implemented as a discrete memory device or, more likely, as allocated space in a memory device having multiple buffers. Assuming an equal number (n) of input and output ports, the total number of buffers 618 is n-squared. Accordingly, for a switch having four input and output port pairs, the total number of buffers 618 is preferably sixteen (i.e. four squared).

Packets that traverse the switch 600 may generally enter at any of the input ports $A_{in}$, $B_{in}$, $C_{in}$ and $D_{in}$ and exit at any of the output ports $A_{out}$, $B_{out}$, $C_{out}$ and $D_{out}$. The precise path through the switch 600 taken by a packet will depend upon its origin, its destination and upon the configuration of the network (e.g., the network 100 of FIG. 1) in which the switch 600 operates. Packets may be queued temporarily in the buffers 618 while awaiting re-transmission by the switch 600. As such, the switch 600 generally operates as a store-and-forward device.

Multiple packets may be received at the various input ports $A_{in}$, $B_{in}$, $C_{in}$ and $D_{in}$ of the switch 600 during overlapping time periods. However, because space in the buffers 618 is allocated for each combination of an input port and an output port, the switch 600 is non-blocking. That is, packets received at different input ports and destined for the same output port (or different output ports) do not interfere with each other while traversing the switch 600. For example, assume a first packet is received at the port $A_{in}$ and is destined for the output port $B_{out}$. Assume also that while this first packet is still traversing the switch 600, a second packet is received at the port $C_{in}$ and is also destined for the output port $B_{out}$. The switch 600 need not wait until the first packet is loaded into the buffers 618 before acting on the second packet. This is because the second packet can be loaded into the buffer $C_{in}/B_{out}$ during the same time that the first packet is being loaded into the buffer $A_{in}/B_{out}$.

While four pairs of input and output ports are shown in FIG. 5 for illustration purposes, it will be apparent that more or fewer ports may be utilized. In one embodiment, the switch 600 includes up to sixteen pairs of input and output ports coupled together in the manner illustrated in FIG. 5. These sixteen input/output port pairs may be distributed among up to sixteen slot cards (one per slot card), where each slot card has a total of sixteen input/output port pairs. A slot card may be, for example, a printed circuit board included in the switch 600. Each slot card may have a first input/output port pair, a second input/output pair and so forth up to a sixteenth input/output port pair. Corresponding pairs of input and output ports of each slot card may be coupled together in the manner described above in reference to FIG. 5. Thus, each slot card may have ports numbered from "one" to "sixteen." The sixteen ports numbered "one" may be coupled together as described in reference to FIG. 5. In addition, the sixteen ports numbered "two" may be coupled together in this manner and so forth for all of the ports with those numbered "sixteen" all coupled together as described in reference to FIG. 5. In this embodiment, each buffer may have space allocated to each of sixteen ports. Thus, the number of buffers 618 may be sixteen per slot card and 256 (i.e. sixteen squared) per switch. As a result of this configuration, a packet received by a first input port of any slot card may be passed directly to any or all of sixteen first output ports of the slot cards. During an overlapping time period, another packet received by the first input port of another slot card may be passed directly to any or all of the sixteen first output ports without these two packets interfering with each other. Similarly, packets received by second input ports may be passed to any second output port of the sixteen slot cards.

Figure 6:
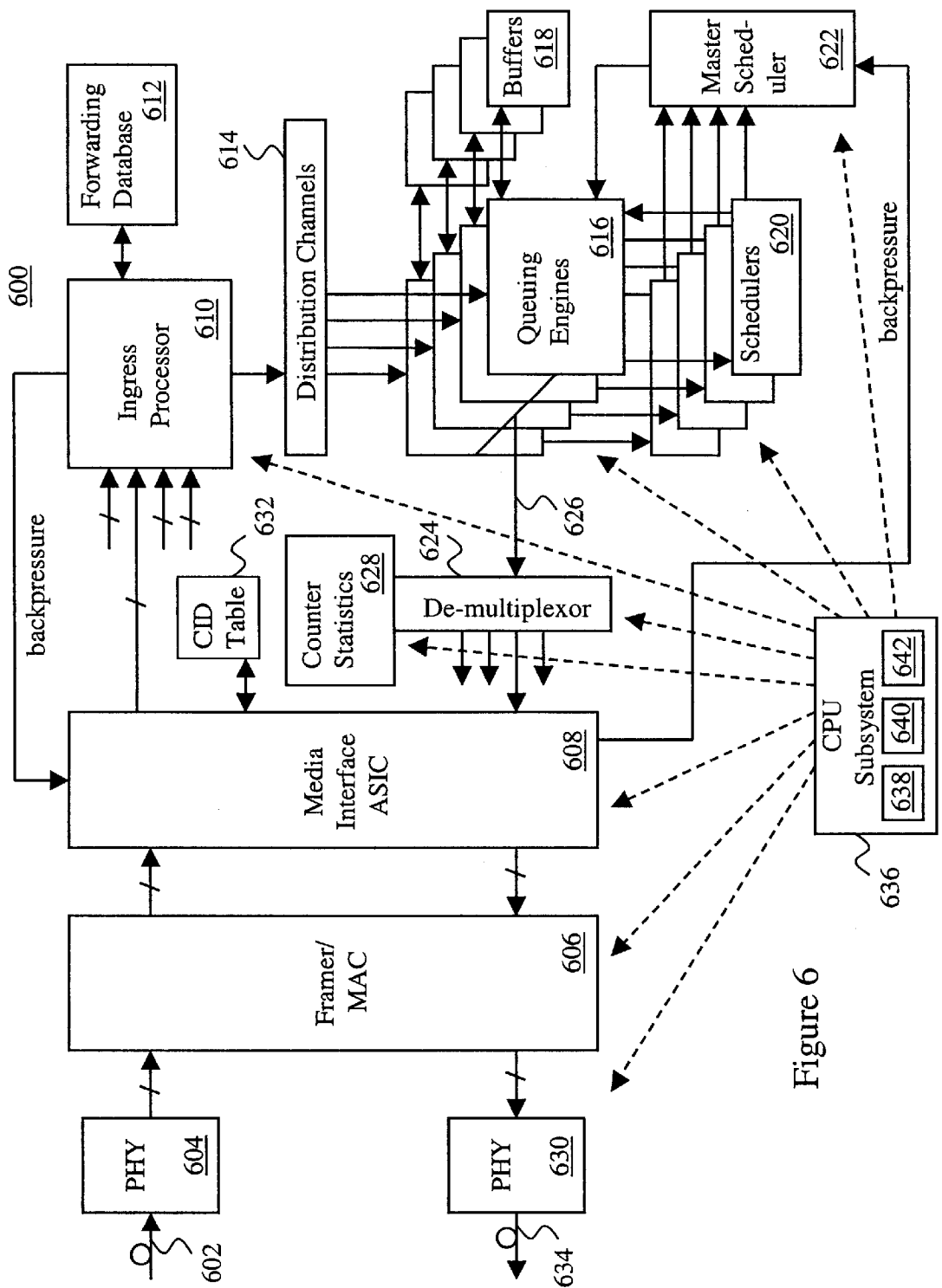
FIG. 6 illustrates a more detailed block schematic diagram showing other aspects of the switch of FIG. 5.

FIG. 6 illustrates a more detailed block schematic diagram showing other aspects of the switch 600. A duplicate of the switch 600 of FIG. 6 may be utilized as any of the switches 124, 126 and 128 or edge equipment 102–110 of FIG. 1. Referring to FIG. 6, the switch 600 includes an input port connected to a transmission media 602. For illustration purposes, only one input port (and one output port) is shown in FIG. 6, though as explained above, the switch 600 includes multiple pairs of ports. Each input port may include an input path through a physical layer device (PHY) 604, a framer/media access control (MAC) device 606 and a media interface (I/F) device 608.

The PHY 604 may provide an interface directly to the transmission media 602 (e.g., the network links of FIG. 1). The PHY 604 may also perform other functions, such as serial-to-parallel digital signal conversion, synchronization, non-return to zero (NRZI) decoding, Manchester decoding, 8B/10B decoding, signal integrity verification and so forth. The specific functions performed by the PHY 604 may depend upon the encoding scheme utilized for data transmission. For example, the PHY 604 may provide an optical interface for optical links within the domain 100 or may provide an electrical interface for links to equipment external to the domain 100.

The framer device 606 may convert data frames received via the media 602 in a first format, such as SONET or Ethernet (e.g., Gigabit or 10 Gigabit), into another format suitable for further processing by the switch 600. For example, the framer device 606 may separate and de-capsulate individual transmission channels from a SONET frame and then identify packets received in each of the channels. The framer device 606 may be coupled to the media I/F device 608. The I/F device 608 may be implemented as an application-specific integrated circuit (ASIC). The I/F device 608 receives the packet from the framer device 606 and identifies a packet type. The packet type may be included in the packet where its position may be identified by the I/F device 608 relative to a start-of-frame flag received from the PHY 604. Examples of packet types include: Ether-type ($V_2$); Institute of Electrical and Electronics Engineers (IEEE) 802.3 Standard; VLAN/Ether-Type or VLAN/802.3. It will be apparent that other packet types may be identified. In addition, the data need not be in accordance with a packetized protocol. For example, as explained in more detail herein, the data may be a continuous stream.

An ingress processor 610 may be coupled to the input port via the media I/F device 608. Additional ingress processors (not shown) may be coupled to each of the other input ports of the switch 600, each port having an associated media I/F device, a framer device and a PHY. Alternately, the ingress processor 610 may be coupled to all of the other input ports. The ingress processor 610 controls reception of data packets. For example, the ingress processor may use the type information obtained by the I/F device 608 to extract a destination key (e.g., a label switch path to the destination node or other destination indicator) from the packet. The destination key may be located in the packet in a position that varies depending upon the packet type. For example, based upon the packet type, the ingress processor 610 may parse the header of an Ethernet packet to extract the MAC destination address.

Memory 612, such as a content addressable memory (CAM) and/or a random access memory (RAM), may be coupled to the ingress processor 610. The memory 612 preferably functions primarily as a forwarding database which may be utilized by the ingress processor 610 to perform look-up operations, for example, to determine based on the destination key for packet which are appropriate output ports for the packet or which is an appropriate label for the packet. The memory 612 may also be utilized to store configuration information and software programs for controlling operation of the ingress processor 610.

The ingress processor 610 may apply backpressure to the I/F device 608 to prevent heavy incoming data traffic from overloading the switch 600. For example, if Ethernet packets are being received from the media 602, the framer device 606 may instruct the PHY 604 to send a backpressure signal via the media 602.

Distribution channels 614 may be coupled to the input ports via the ingress processor 610 and to a plurality of queuing engines 616. In one embodiment, one queuing engine may be provided for each pair of an input port and an output port for the switch 600, in which case, one ingress processor may also be provided for the input/output port pair. Note that each input/output pair may also be referred to as a single port or a single input/output port. The distribution channels 614 preferably provide direct connections from each input port to multiple queuing engines 616 such that a received packet may be simultaneously distributed to the multiple queuing engines 616 and, thus, to the corresponding output ports, via the channels 614. For example, each input port may be directly coupled by the distribution channels 614 to the corresponding queuing engine of each slot card, as explained in reference to FIG. 5.

Each of the queuing engines 616 is also associated with one or more of a plurality of buffers 618. Because the switch 600 preferably includes sixteen input/output ports per slot card, each slot card preferably includes sixteen queuing engines 616 and sixteen buffers 618. In addition, each switch 600 preferably includes up to sixteen slot cards. Thus, the number of queuing engines 616 corresponds to the number of input/output ports and each queuing engine 616 has an associated buffer 618. It will be apparent, however, that other numbers can be selected and that less than all of the ports of a switch 600 may be used in a particular configuration of the network 100 (FIG. 1).

As mentioned, packets are passed from the ingress processor 610 to the queuing engines 616 via distribution channels 614. The packets are then stored in buffers 618 while awaiting retransmission by the switch 600. For example, a packet received at one input port may be stored in any one or more of the buffers 618. As such, the packet may then be available for re-transmission via any one or more of the output ports of the switch 600. This feature allows packets from various different input ports to be simultaneously directed through the switch 600 to appropriate output ports in a non-blocking manner in which packets being directed through the switch 600 do not impede each other's progress.

For scheduling transmission of packets stored in the buffers 618, each queuing engine 616 has an associated scheduler 620. The scheduler 620 may be implemented as an integrated circuit chip. Preferably, the queuing engines 616 and schedulers 620 are provided two per integrated circuit chip. For example, each of eight scheduler chips may include two schedulers. Accordingly, assuming there are sixteen queuing engines 616 per slot card, then sixteen schedulers 620 are preferably provided.

Each scheduler 620 may prioritize data packets by selecting the most eligible packet stored in its associated buffer 618. In addition, a master-scheduler 622, which may be implemented as a separate integrated circuit chip, may be coupled to all of the schedulers 620 for prioritizing transmission from among the then-current highest priority packets from all of the schedulers 620. Accordingly, the switch 600 preferably utilizes a hierarchy of schedulers with the master scheduler 622 occupying the highest position in the hierarchy and the schedulers 620 occupying lower positions. This is useful because the scheduling tasks are distributed among the hierarchy of scheduler chips to efficiently handle a complex hierarchical priority scheme.

For transmitting the packets, the queuing engines 616 are coupled to the output ports of the switch 600 via demultiplexor 624. The demultiplexor 624 routes data packets from a communication bus 626, shared by all of the queuing engines 616, to the appropriate output port for the packet. Counters 628 for gathering statistics regarding packets routed through the switch 600 may be coupled to the demultiplexor 624.

Each output port may include an output path through a media I/F device, framer device and PHY. For example, an output port for the input/output pair illustrated in FIG. 6 may include the media I/F device 608, the framer device 606 and the PHY 604.

In the output path, the I/F device 608, the framer 606 and an output PHY 630 may essentially reverse the respective operations performed by the corresponding devices in the input path. For example, the I/F device 608 may appropriately format outgoing data packets based on information obtained from a connection identification (CID) table 632 coupled to the I/F device 608. The I/F device 608 may also add a link-layer, encapsulation header to outgoing packets. In addition, the media I/F device 608 may apply backpressure to the master scheduler 622 if needed. The framer 606 may then convert packet data from a format processed by the switch 600 into an appropriate format for transmission via the network 100 (FIG. 1). For example, the framer device 606 may combine individual data transmission channels into a SONET frame. The PHY 630 may perform parallel to serial conversion and appropriate encoding on the data frame prior to transmission via the media 634. For example, the PHY 630 may perform NRZI encoding, Manchester encoding or 8B/10B decoding and so forth. The PHY 630 may also append an error correction code, such as a checksum, to packet data for verifying integrity of the data upon reception by another element of the network 100 (FIG. 1).

A central processing unit (CPU) subsystem 636 included in the switch 600 provides overall control and configuration functions for the switch 600. For example, the subsystem 636 may configure the switch 600 for handling different communication protocols and for distributed network management purposes. In one embodiment, each switch 600 includes a fault manager module 638, a protection module 640, and a network management module 642. For example, the modules 638–642 included in the CPU subsystem 636 may be implemented by software programs that control a general-purpose processor of the system 636.

Figure 7A:
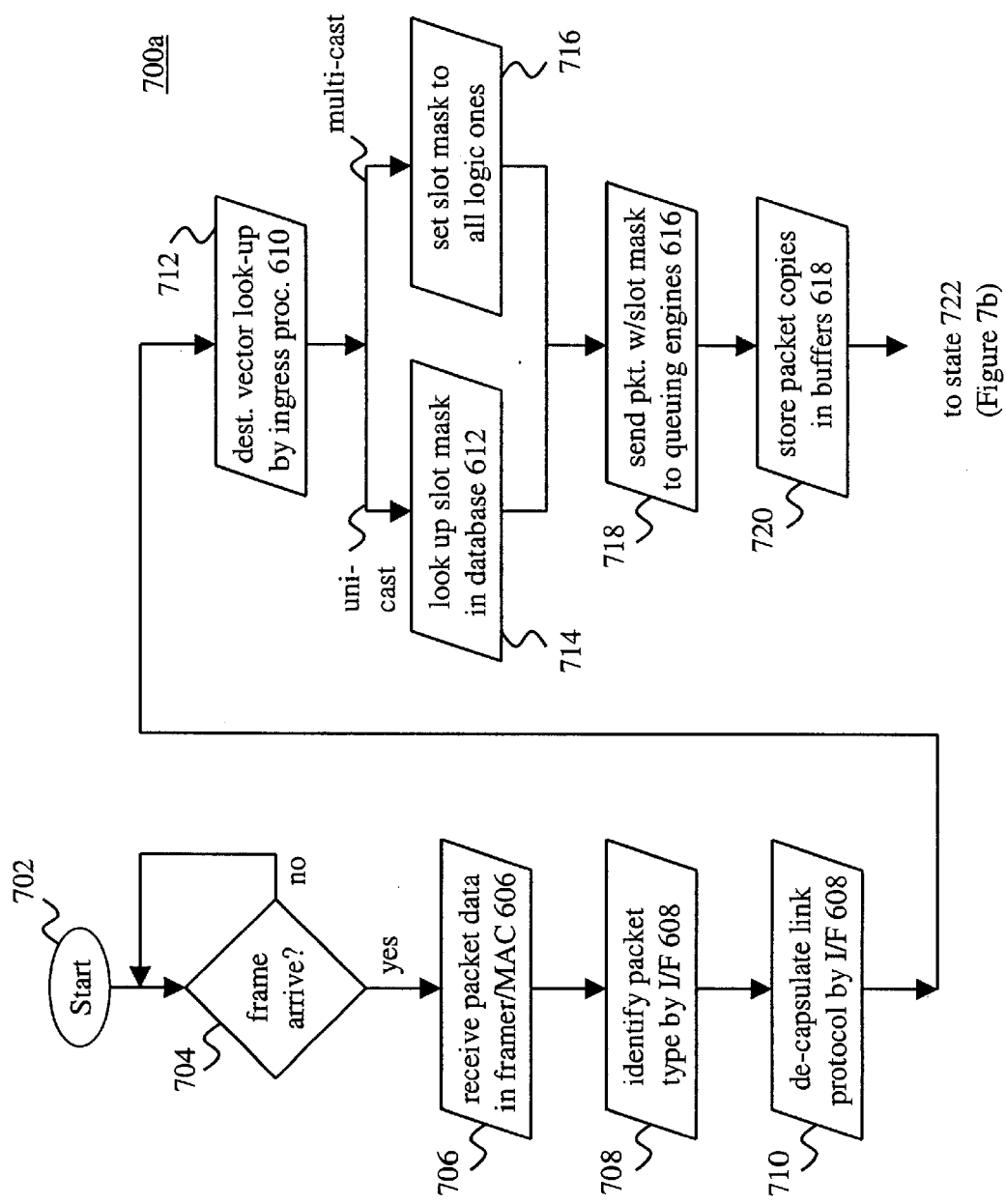
FIG. 7 illustrates a flow diagram for packet data traversing the switch of FIGS. 5 and 6.
Figure 7B:
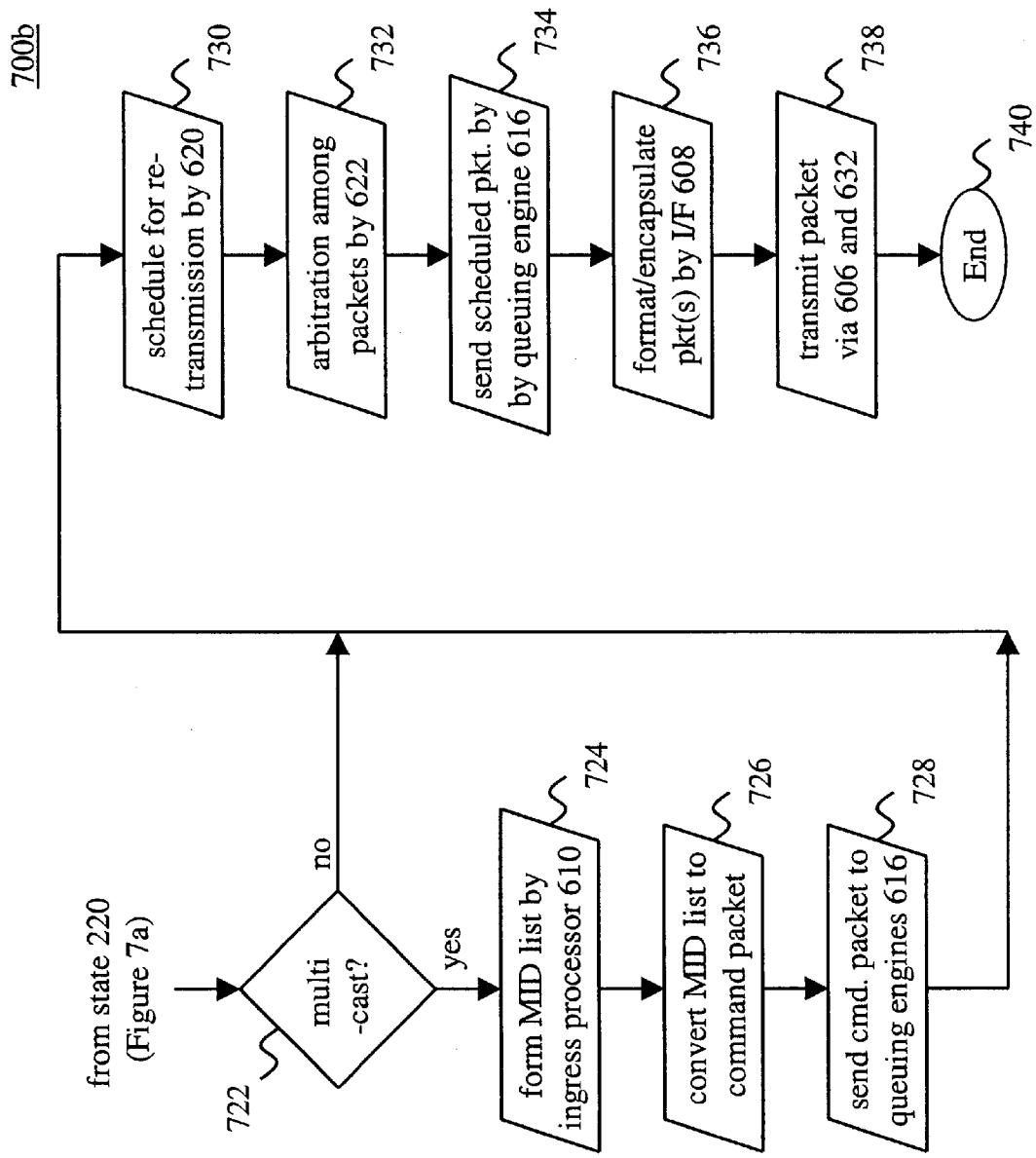

FIGS. 7a–b illustrate a flow diagram 700 for packet data traversing the switch 600 of FIGS. 5 and 6. Program flow begins in a start state 702 and moves to a state 704 where the switch 600 awaits incoming packet data, such as a SONET data frame. When packet data is received at an input port of the switch 600, program flow moves to a state 706. Note that packet data may be either a uni-cast packet or a multi-cast. The switch 600 treats each appropriately, as explained herein.

As mentioned, an ingress path for the port includes the PHY 604, the framer media access control (MAC) device 606 and a media interface (I/F) ASIC device 608 (FIG. 6). Each packet typically includes a type in its header and a destination key. The destination key identifies the appropriate destination path for the packet and indicates whether the packet is uni-cast or multi-cast. In the state 704, the PHY 604 receives the packet data and performs functions such as synchronization and decoding. Then program flow moves to a state 706.

In the state 706, the framer device 606 (FIG. 6) receives the packet data from the PHY 604 and identifies each packet. The framer 606 may perform other functions, as mentioned above, such as de-capsulation. Then, the packet is passed to the media I/F device 608.

In a state 708, the media I/F device 608 may determine the packet type. In a state 710, a link layer encapsulation header may also be removed from the packet by the I/F device 608 when necessary.

From the state 710, program flow moves to a state 712. In the state 712, the packet data may be passed to the ingress process 610. The location of the destination key may be determined by the ingress processor 610 based upon the packet type. For example, the ingress processor 610 parses the packet header appropriately depending upon the packet type to identify the destination key in its header.

In the state 712, the ingress processor 610 uses the key to look up a destination vector in the forwarding database 612. The vector may include: a multi-cast/uni-cast indication bit (M/U); a connection identification (CID); and, in the case of a uni-cast packet, a destination port identification. The CID may be utilized to identify a particular data packet as belonging to a stream of data or to a related group of packets. In addition, the CID may be reusable and may identify the appropriate encapsulation to be used for the packet upon retransmission by the switch. For example, the CID may be used to convert a packet format into another format suitable for a destination node, which uses a protocol that differs from that of the source. In the case of a multi-cast packet, a multi-cast identification (MID) takes the place of the CID. Similarly to the CID, the MID may be reusable and may identify the packet as belonging to a stream of multi-cast data or a group of related multi-cast packets. Also, in the case of a multi-cast packet, a multi-cast pointer may take the place of the destination port identification, as explained in reference to the state 724. The multi-cast pointer may identify a multi-cast group to which the packet is to be sent.

In the case of a uni-cast packet, program flow moves from the state 712 to a state 714. In the state 714, the destination port identification is used to look-up the appropriate slot mask in a slot conversion table (SCT). The slot conversion table is preferably located in the forwarding database 612 (FIG. 6). The slot mask preferably includes one bit at a position that corresponds to each port. For the uni-cast packet, the slot mask will include a logic "one" in the bit position that corresponds to the appropriate output port. The slot mask will also include logic "zeros" in all the remaining bit positions corresponding to the remaining ports. Thus, assuming that each slot card of the switch 600 includes sixteen output ports, the slot masks are each sixteen bits long (i.e. two bytes).

In the case of a multi-cast packet, program flow moves from the state 712 to a state 716. In the state 716, the slot mask may be determined as all logic "ones" to indicate that every port is a possible destination port for the packet.

Program flow then moves to a state 718. In the state 718, the CID (or MID) and slot mask are then appended to the packet by the ingress processor 610 (FIG. 6). The ingress processor 610 then forwards the packet to all the queuing engines 616 via the distribution channels 614. Thus, the packet is effectively broadcast to every output port, even ports that are not an appropriate output port for forwarding the packet. Alternately, for a multi-cast packet, the slot mask may have logic "ones" in multiple positions corresponding to those ports that are appropriate destinations for forwarding the packet.

FIG. 8 illustrates a uni-cast packet 800 prepared for delivery to the queuing engines 616 of FIG. 6. As shown in FIG. 8, the packet 800 includes a slot mask 802, a burst type 804, a CID 806, an M/U bit 808 and a data field 810. The burst type 804 identifies the type of packet (e.g., uni-cast, multi-cast or command). As mentioned, the slot mask 802 identifies the appropriate output ports for the packet, while the CID 806 may be utilized to identify a particular data packet as belonging to a stream of data or to a related group of packets. The M/U bit 808 indicates whether the packet is uni-cast or multi-cast.

FIG. 9 illustrates a multi-cast packet 900 prepared for delivery to the queuing engines 616 of FIG. 6. Similarly to the uni-cast packet of FIG. 8, the multi-cast packet 900 includes a slot mask 902, a burst type 904, a MID 906, an M/U bit 908 and a data field 910. However, for the multi-cast packet 900, the slot mask 902 is preferably all logic "ones" and the M/U 908 will be an appropriate value.

Referring again to FIG. 7, program flow moves from the state 718 to a state 720. In the state 720, using the slot mask, each queuing engine 616 (FIG. 6) determines whether it is an appropriate destination for the packet. This is accomplished by each queuing engine 616 determining whether the slot mask includes a logic "one" or a "zero" in the position corresponding to that queuing engine 616. If a "zero," the queuing engine 616 can ignore or drop the packet. If indicated by a "one," the queuing engine 616 transfers the packet to its associated buffer 618. Accordingly, in the state 720, when a packet is uni-cast, only one queuing engine 616 will generally retain the packet for eventual transmission by the appropriate destination port. For a multi-cast packet, multiple queuing engines 616 may retain the packet for eventual transmission. For example, assuming a third ingress processor 610 (out of sixteen ingress processors) received the multi-cast packet, then a third queuing engine 616 of each slot card (out of sixteen per slot card) may retain the packet in the buffers 618. As a result, sixteen queuing engines 616 receive the packet, one queuing engine per slot card.

Figure 10:
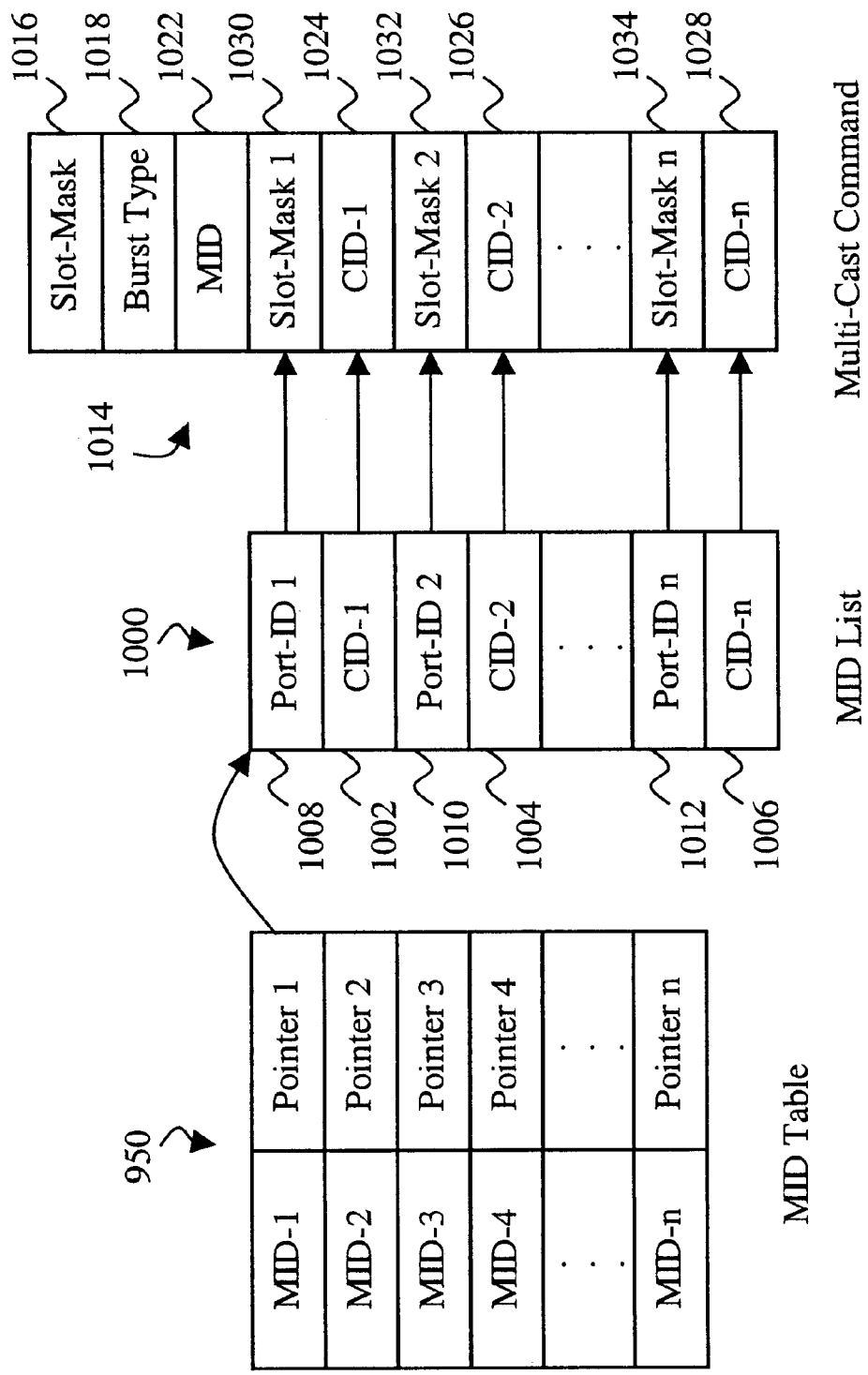
FIG. 10 illustrates a multi-cast identification (MID) list and corresponding command packet for directing transmission of the multi-cast packet of FIG. 9.

As shown in FIG. 7, in a state 722, a determination is made as to whether the packet is uni-cast or multi-cast. This may be accomplished based on the M/U bit in the packet. In the case of a multi-cast packet, program flow moves from the state 722 to a state 724. In the state 724, the ingress processor 610 (FIG. 6) may form a multi-cast identification (MID) list. This is accomplished by the ingress processor 610 looking up the MID for the packet in a portion of the database 612 (FIG. 6) that provides a table for MID list look-ups. This MID table 950 is illustrated in FIG. 10. As shown in FIG. 10, for each MID, the table 950 may include a corresponding entry that includes an offset pointer to an appropriate MID list stored elsewhere in the forwarding database 612. FIG. 10 also illustrates an exemplary MID list 1000. Each MID list 1000 preferably includes one or more CIDs, one for each packet that is to be re-transmitted by the switch 600 in response to the multi-cast packet. That is, if the multi-cast packet is to be re-transmitted eight times by the switch 600, then looking up the MID in the table 950 will result in finding a pointer to a MID list entry 1000 having eight CIDs. For each CID, the MID list 1000 may also include the port identification for the port (i.e. the output port) that is to re-transmit a packet in response to the corresponding CID. Thus, as shown in FIG. 10, the MID list 1000 includes a number (n) of CIDs 1002, 1004, and 1006. For each CID in the list 1000, the list 1000 includes a corresponding port identification 1008, 1010, 1012.

In sum, in the state 724 the MID may be looked up in a first table 950 to identify a multi-cast pointer. The multi-cast pointer may be used to look up the MID list in a second table. The first table may have entries of uniform size, whereas, the entries in the second table may have variable size to accommodate the varying number of packets that may be forwarded based on a single multi-cast packet.

Program flow then moves to a state 726 (FIG. 7) in which the MID list 1000 may be converted into a command packet 1014. FIG. 10 illustrates the command packet 1014. The command packet 1014 may be organized in a manner similar to that of the uni-cast packet 800 (FIG. 8) and the multi-cast packet 900 (FIG. 9). That is, the command packet 1014 may include a slot-mask 1016, a burst type 1018, a MID 1020 and additional information, as explained herein.

The slot-mask 1016 of the command packet 1014 preferably includes all logic "ones" so as to instruct all of the queuing engines 616 (FIG. 6) to accept the command packet 1014. The burst type 1018 may identify the packet as a command so as to distinguish it from a uni-cast or multi-cast packet. The MID 1020 may identify a stream of multi-cast data or a group of related multi-cast packets to which the command packet 1014 belongs. As such, the MID 1018 is utilized by the queuing engines 616 to correlate the command packet 1014 to the corresponding prior multi-cast packet (e.g., packet 902 of FIG. 9).

As mentioned, the command packet 1014 includes additional information, such as CIDs 1024, 1026, 1028 taken from the MID list (i.e. CIDs 1002, 1004, 1006, respectively) and slot masks 1030, 1032, 1034. Each of the slot masks 1030, 1032, 1034 corresponds to a port identification contained in the MID list 1000 (i.e. port identifications 1008, 1010, 1012, respectively). To obtain the slot masks 1030, 1032, 1034, the ingress processor 610 (FIG. 6) may look up the corresponding port identifications 1008, 1010, 1012 from the MID list 1000 in the slot conversion table (SCT) of the database 612 (FIG. 6). Thus, for each CID there is a different slot mask. This allows a multi-cast packet to be retransmitted by the switch 600 (FIGS. 5 and 6) with various different encapsulation schemes and header information.

Then, program flow moves to a state 728 (FIG. 7). In the state 728, the command packet 1014 (FIG. 10) is forwarded to the queuing engines 616 (FIG. 6). For example, the queuing engines that correspond to the ingress processor 610 that received the multi-cast packet may receive the command packet from that ingress processor 610. Thus, if the third ingress processor 610 (of sixteen) received the multi-cast packet, then the third queuing engine 616 of each slot card may receive the command packet 1014 from that ingress processor 610. As a result, sixteen queuing engines receive the command packet 1014, one queuing engine 616 per slot card.

From the state 728, program flow moves to a state 730. In the state 730, the queuing engines 616 respond to the command packet 1014. This may include the queuing engine 616 for an output port dropping the prior multi-cast packet 900 (FIG. 9). A port will drop the packet if that port is not identified in any of the slot masks 1030, 1032, 1034 of the command packet 1014 as an output port for the packet.

For ports that do not drop the packet, the appropriate scheduler 620 queues the packet for retransmission. Program flow then moves to a state 732, in which the master scheduler 622 arbitrates among packets readied for retransmission by the schedulers 620.

In a state 734, the packet identified as ready for retransmission by the master scheduler 622 is retrieved from the buffers 618 by the appropriate queuing engine 616 and forwarded to the appropriate I/F device(s) 608 via the demultiplexor 624. Program flow then moves to a state 736.

In the state 736, for each slot mask, a packet is formatted for re-transmission by the output ports identified in the slot mask. This may include, for example, encapsulating the packet according to an encapsulation scheme identified by looking up the corresponding CID 1024, 1026, 1028 in the CID table 630 (FIG. 6).

For example, assume that the MID list 1000 (FIG. 10) includes two port identifications and two corresponding CIDs. In which case, the command packet 1014 may only include: slot-mask 1016; burst type 1018; MID 1022; "Slot-Mask 1" 1030; "CID-1" 1024; "Slot-Mask 2" 1032; and "CID-2" 1026. Assume also that "Slot-Mask 1" 1030 indicates that Port Nos. 3 and 8 of sixteen are to retransmit the packet. Accordingly, in the state 730 (FIG. 7), the I/F devices 608 for those two ports cause the packet to be formatted according to the encapsulation scheme indicated by "CID-1" 1024. In addition, the queuing engines for Port Nos. 1–2, 4–7 and 9–12 take no action with respect to "CID-1" 1024. Further, assume that "Slot Mask 2" 1032 indicates that Port No. 10 is to retransmit the packet. Then, in the state 730, the I/F device 608 for Port No. 10 formats the packet as indicated by "CID-2" 1026, while the queuing engines for the remaining ports take no action with respect to "CID-2" 1026. Because, in this example, no other ports are identified in the multi-cast command, the queuing engines 616 for the remaining ports (i.e. Port Nos. 1–2, 4–7, 9, and 11–12) take no action with respect to re-transmission of the packet and, thus, may drop the packet.

From the state 736 (FIG. 7), program flow moves to a state 740 where the appropriately formatted multi-cast packets may be transmitted. For example, the packets may be passed to the transmission media 634 (FIG. 6) via the media I/F device 608, the framer MAC 606 and the PHY 630.

The uni-cast packet 800 (FIG. 8) preferably includes all of the information needed for retransmission of the packet by the switch 600. Accordingly, a separate command packet, such as the packet 1014 (FIG. 10) need not be utilized for uni-cast packets. Thus, referring to the flow diagram of FIG. 7, in the case of a uni-cast packet, program flow moves from the state 722 to the state 730. In the states 730 and 732, the packet is queued for retransmission. Then, in the state 734, the packet is forwarded to the I/F device 608 of the appropriate port identified by the slot mask 802 (FIG. 8) for the packet. In the state 736, the CID 806 (FIG. 8) from the packet 800 is utilized to appropriately encapsulate the packet payload 810. Then, in the state 738, the output port for the packet retransmits the packet to its associated network segment.

Typically, the slot mask 802 (FIG. 8) for a uni-cast packet will include a logic "one" in a single position with logic "zeros" in all the remaining positions. However, under certain circumstances, a logic "one" may be included in multiple positions of the slot mask 802 (FIG. 8). In which case, the same packet is transmitted multiple times by different ports, however, each copy uses the same CID. Accordingly, such a packet is forwarded in substantially the same format by multiple ports. This is unlike a multi-cast packet in which different copies may use different CIDs and, thus, may be formatted in accordance with different communication protocols.

In accordance with the present invention, an address learning technique is provided. Address look-up table entries are formed and stored at the switch or edge equipment (also referred to as "destination equipment"—a duplicate of the switch 600 illustrated in FIGS. 5 and 6 may be utilized as any of the destination equipment) that provides the packet to the intended destination node for the packet. Recall the example from above where the user entity has facilities at three different locations: a first facility located in San Jose, Calif.; a second facility located in Chicago, Ill.; and a third facility located in Austin, Tex. Assume also that the first facility includes customer equipment 112 (FIG. 1); the second facility includes customer equipment 118 (FIG. 1); and the third facility includes customer equipment 120 (FIG. 1). LANs located at each of the facilities may include the customer equipment 112, 118 and 120 and may communicate using an Ethernet protocol.

When the edge equipment 102, 106, 108 receive Ethernet packets from any of the three facilities of the user entity that are destined for another one of the facilities, the edge equipment 102–110 and switches 124–128 of the network 100 (FIG. 1) appropriately encapsulate and route the packets to the appropriate facility. Note that that customer equipment 112, 118, 120 will generally filter data traffic that is local to the equipment 112, 118, 120. As such, the edge equipment 102, 106, 108 will generally not receive that local traffic. However, the learning technique of the present invention may be utilized for filtering such packets from entering the network 100 as well as appropriately directing packets within the network 100.

Figure 11:
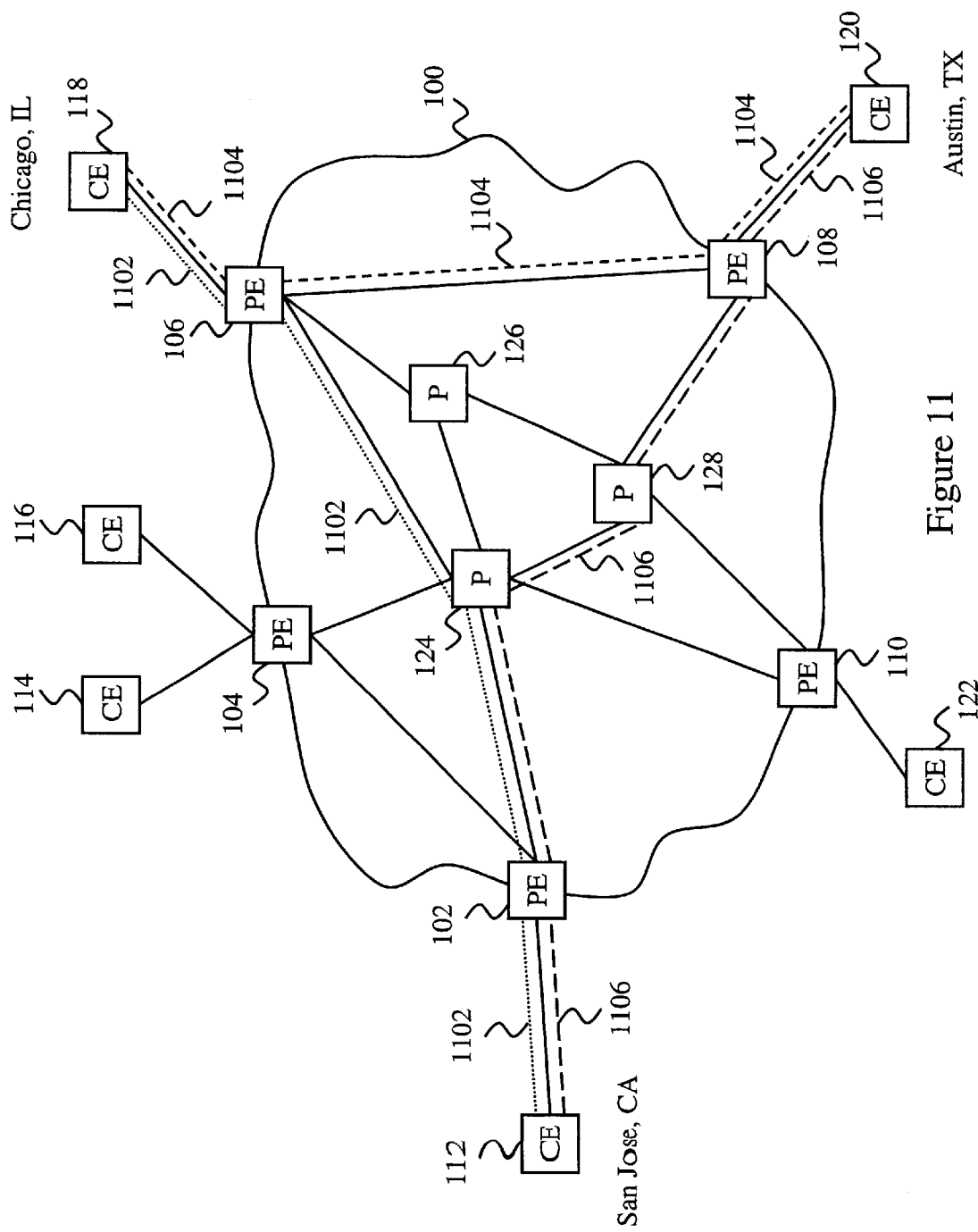
FIG. 11 illustrates the network of FIG. 1 including three label-switched paths.

Because the network 100 (FIG. 1) preferably operates in accordance with a label switching protocol, label switched paths (LSPs) may be provided for routing data packets. Corresponding destination keys may be used to identify the LSPs. In this example, LSPs may be set up to forward appropriately encapsulated Ethernet packets between the external equipment 112, 118, 120. These LSPs are then available for use by the user entity having facilities at those locations. FIG. 11 illustrates the network 100 and external equipment 112–122 of FIG. 1 along with LSPs 1102–1106. More particularly, the LSP 1102 provides a path between external equipment 112 and 118; the LSP 1104 provides a path between external equipment 118 and 120; and the LSP 1106 provides a path between the external equipment 120 and 112. It will be apparent that alternate LSPs may be set up between the equipment 112, 118, 120 as needs arise, such as to balance data traffic or to avoid a failed network link.

Figure 12:
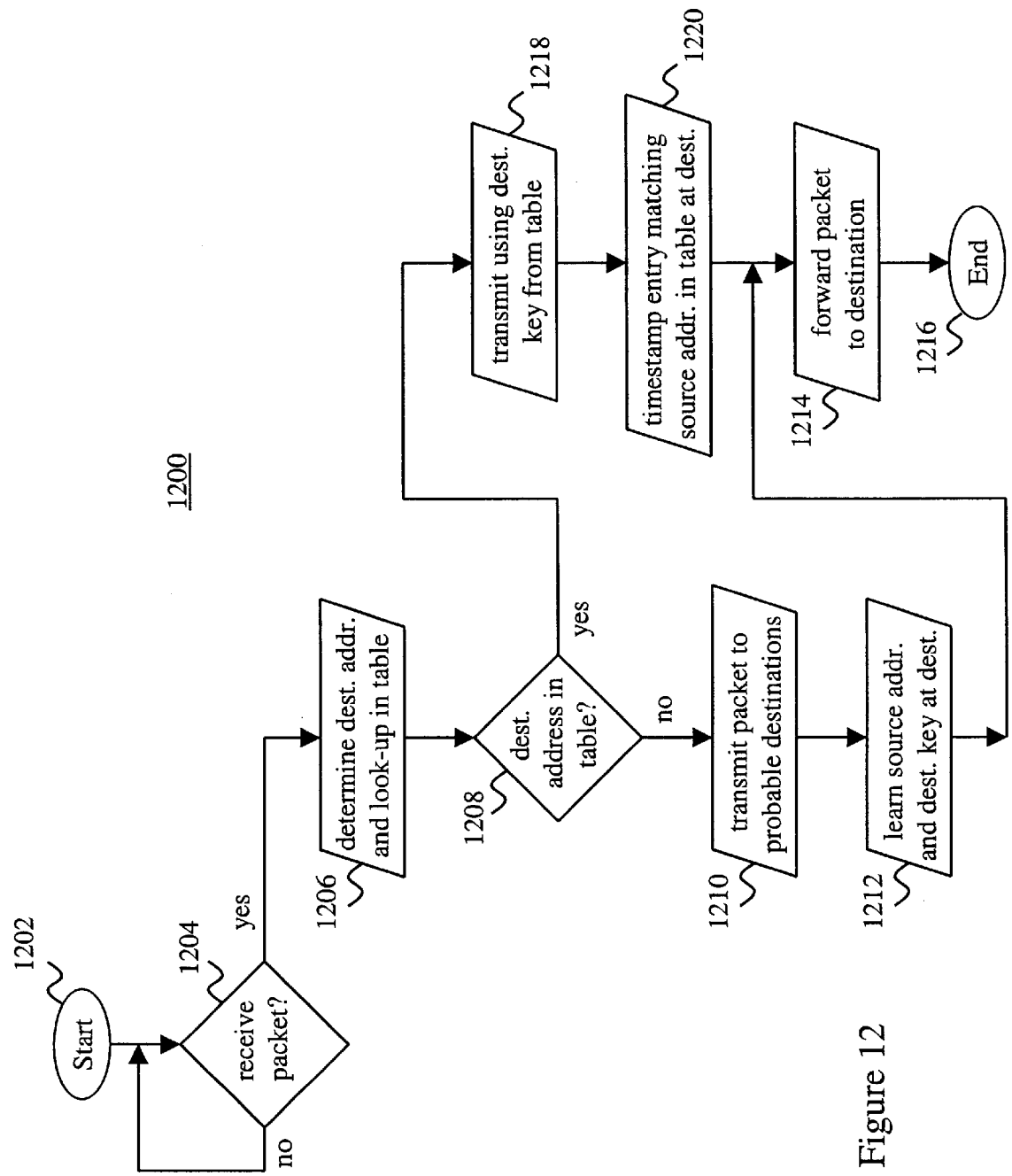
FIG. 12 illustrates a flow diagram for address learning at destination equipment 5 in the network of FIG. 11.

FIG. 12 illustrates a flow diagram 1200 for address learning at destination equipmentports and channels. Program flow begins in a start state 1202. From the start state 1202, program flow moves to a state 1204 where equipment (e.g., edge equipment 102, 106 or 108) of the network 100 (FIGS. 1 and 12) await reception of a packet (e.g., an Ethernet packet) or other data from external equipment (e.g., 112, 118 or 120, respectively).

When a packet is received, program flow moves to a state 1206 where the equipment determines the destination information from the packet, such as its destination address. For example, referring to FIG. 11, the user facility positioned at external equipment 112 may transmit a packet intended for a destination at the external equipment 118. Accordingly, the destination address of the packet will identify a node located at the external equipment 118. In this example, the edge equipment 102 will receive the packet and determine its destination address.

Once the destination address is determined, the equipment may look up the destination address in an address look-up table. Such a look-up table may be stored, for example, in the forwarding database 612 (FIG. 6) of the edge equipment 102. Program flow may then move to a state 1208.

In the state 1208, a determination is made as to whether the destination address from the packet can be found in the table. If the address is not found in the table, then this indicates that the equipment (e.g., edge equipment 102) will not be able to determine the precise LSP that will route the packet to its destination. Accordingly, program flow moves from the state 1208 to a state 1210.

In the state 1210, the network equipment that received the packet (e.g., edge equipment 102 of FIG. 11) forwards the packet to all of the probable destinations for the packet. For example, the packet may be sent as a multi-cast packet in the manner explained above. In the example of FIG. 11, the edge equipment 102 will determine that the two LSPs 1202 and 1206 assigned to the user entity are probable paths for the packet. For example, this determination may be based on knowledge that that the packet originated from the user facility at external equipment 112 (FIG. 11) and that LSPs 1102, 1104 and 1106 are assigned to the user entity. Accordingly, the edge equipment forwards the packet to both external equipment 118 and 120 via the LSPs 1102 and 1106, respectively.

From the state 1210, program flow moves to a state 1212. In the state 1212, all of the network equipment that are connected to the probable destination nodes for the packet (i.e. the "destination equipment" for the packet) receive the packet and, then, identify the source address from the packet. In addition, each forms a table entry that includes the source address from the packet and a destination key that corresponds to the return path of the respective LSP by which the packet arrived. The entries are stored in respective address look-up tables of the destination equipment. In the example of FIG. 11, the edge equipment 106 stores an entry including the MAC source address from the packet and an identification of the LSP 1102 in its look-up table (e.g., located in database 612 of the edge equipment 106). In addition, the edge equipment 108 stores an entry including the MAC source address from the packet and an identification of the LSP 1104 in its respective look-up table (e.g., its database 612).

From the state 1212, program flow moves to a state 1214. In the state 1214, the equipment that received the packet forwards it to the appropriate destination node. More particularly, the equipment forwards the packet to its associated external equipment where it is received by the destination node identified as in the destination address for the packet. In the example of FIG. 11, because the destination node for the packet is located at the external equipment 118, the destination node receives the packet from the external equipment 118. Note that the packet is also forwarded to external equipment that is not connected to the destination node for the packet. This equipment will filter (i.e. drop) the packet. Thus, in the example, the external equipment 120 receives the packet and filters it. Program flow then terminates in a state 1216.

When a packet is received by equipment of the network 100 (FIGS. 1 and 11) and there is an entry in the address look-up table of the equipment that corresponds to the destination address of the packet, the packet will be directed to the appropriate destination node via the LSP identified in the look-up table. Returning to the example of FIG. 11, if a node at external equipment 120 originates a packet having as its destination address the MAC address of the node (at external equipment 112) that originated the previous packet discussed above, then the edge equipment 108 will have an entry in its address look-up table that correctly identifies the LSP 1106 as the appropriate path to the destination node for the packet. This entry would have been made in the state 1212 as discussed above.

Thus, returning to the state 1208, assume that the destination address was found in the look-up table of the equipment that received the packet in the state 1204. In the example of FIG. 11 where a node at external equipment 112 sends a packet to a node at external equipment 118, the look-up table consulted in the state 1208 is at edge equipment 102. In this case, program flow moves from the state 1208 to a state 1218.

In the state 1218, the destination key from the table identifies the appropriate LSP to the destination node. In the example, the LSP 702 is identified as the appropriate path to the destination node.

Then, the equipment of the network 100 (FIGS. 1 and 11) forwards the packet along the path identified from the table. In the example, the destination key directs the packet along LSP 1102 (FIG. 8) in accordance with a label-switching protocol. Because the appropriate path (or paths) is identified from the look-up table, the packet need not be sent to other portions of the network 100.

From the state 1218, program flow moves to a state 1220. In the state 1220, the table entry identified by the source address may be updated with a new timestamp. The timestamps of entries in the forwarding table 612 may be inspected periodically, such as by an aging manager module of the subsystem 636 (FIG. 6). If the timestamp for an entry was updated in the prior period, the entry is left in the database 612. However, if the timestamp has not been recently updated, then the entry may be deleted from the database 612. This helps to ensure that packets are not routed incorrectly when the network 100 (FIG. 1) is altered, such as by adding, removing or relocating equipment or links.

Program flow then moves to the state 1214 where the packet is forwarded to the appropriate destination node for the packet. Then, program flow terminates in the state 1216. Accordingly, a learning technique for forming address lookup tables at destination equipment has been described.

As mentioned, the equipment of the network 100 (FIG. 1), such as the switch 600 (FIGS. 5 and 6), generally operate in a store-and-forward mode. That is, a data packet is generally received in its entirety by the switch 600 prior to being forwarded by the switch 600. This allows the switch 600 to perform functions that could not be performed unless each entire packet was received prior to forwarding. For example, the integrity of each packet may be verified upon reception by recalculating an error correction code and then attempting to match the calculated value to one that is appended to the received packet. In addition, packets can be scheduled for retransmission by the switch 200 in an order that differs from the order in which the packets were received. This may be useful in the event that missed packets need resending out of order.

This store-and-forward scheme works well for data communications that are tolerant to transmission latency, such as most forms of packetized data. A specific example of a latency-tolerant communication is copying computer data files from one computer system to another. However, certain types of data are intolerant to latency introduced by such store-and-forward transmissions. For example, forms of time division multiplexing (TDM) communication in which continuous communication sessions are set up temporarily and then taken down, tend to be latency intolerant during periods of activity. Specific examples not particularly suitable for store-and-forward transmissions include long or continuous streams of data, such as streaming video data or voice signal data generated during real-time telephone conversations. Thus, the present invention employs a technique for using the same switch fabric resources described herein for both types of data.

In sum, large data streams are divided into smaller portions. Each portion is assigned a high priority (e.g., a highest level available) for transmission and a tracking header for tracking the header through the network equipment, such as the switch 600. The schedulers 620 (FIG. 6) and the master scheduler 622 (FIG. 6) will then ensure that the data stream is cut-through the switch 600 without interruption. Prior to exiting the network equipment, the portions are reassembled into the large packet. Thus, the smaller portions are passed using a "store-and-forward" technique. Because the portions are each assigned a high priority, the large packet is effectively "cut-through" the network equipment. This reduces transmission delay and buffer over-runs that otherwise occur in transmitting large packets.

Under certain circumstances, these TDM communications may take place using dedicated channels through the switch 600 (FIG. 6). In which case, there would not be traffic contention. Thus, under these conditions, a high priority would not need to be assigned to the smaller packet portions.

Figure 13:
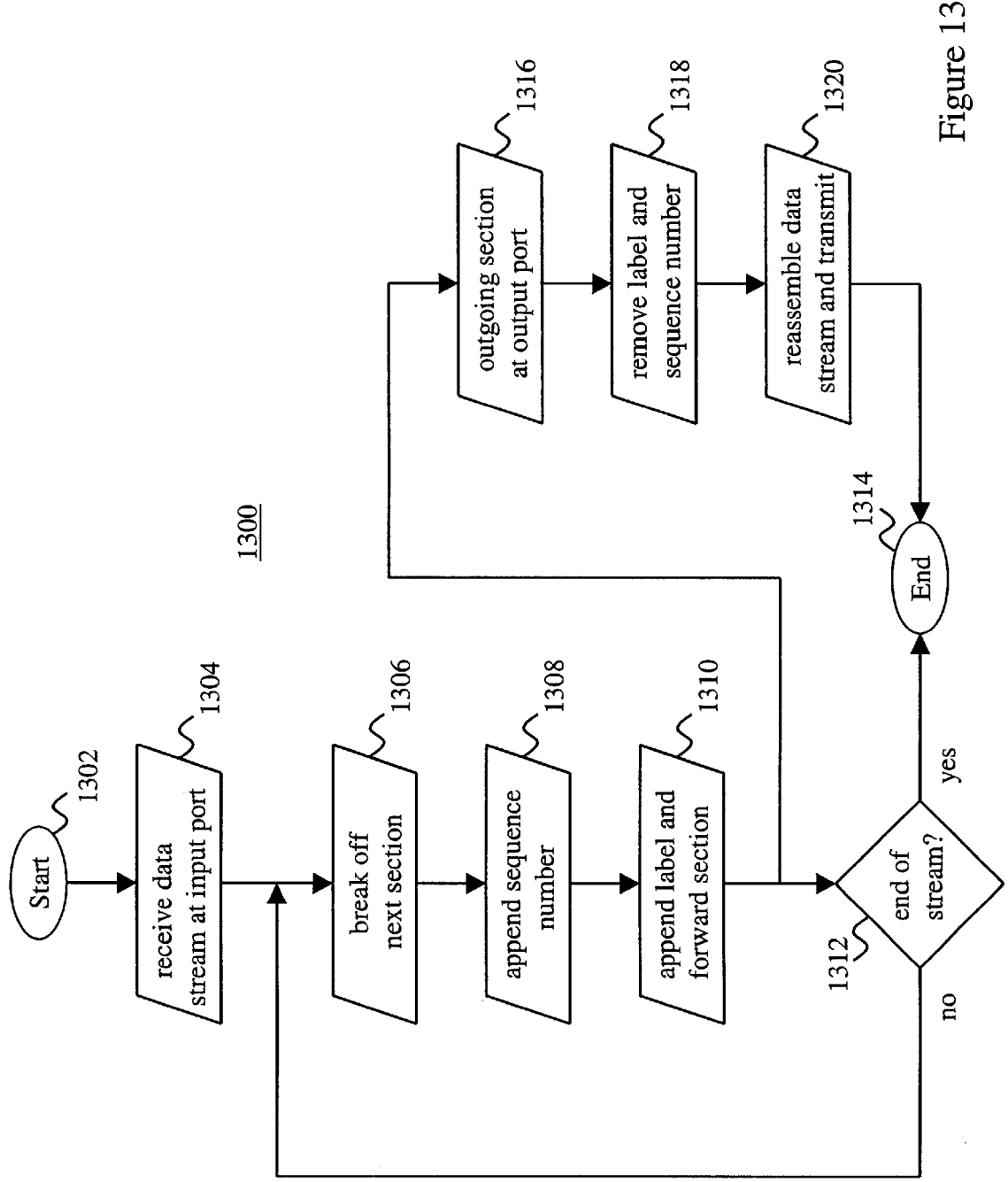
FIG. 13 illustrates a flow diagram for performing cut-through for data streams in the network of FIG. 1.

FIG. 13 illustrates a flow diagram 1300 for performing cut-through for data streams in the network of FIG. 1. Referring to FIG. 13, program flow begins in a start state 1302. Then, program flow moves to a state 1304 where a data stream (or a long data packet) is received by a piece of equipment in the network 100 (FIG. 1). For example, the switch 600 (FIGS. 5 and 6) may receive the data stream into the input path of one of its input ports. The switch 600 may distinguish the data stream from shorter data packets by the source of the stream, its intended destination, its type or is length. For example, the length of the incoming packet may be compared to a predetermined length and if the predetermined length is exceeded, then this indicates a data stream rather than a shorter data packet.

Figure 14:
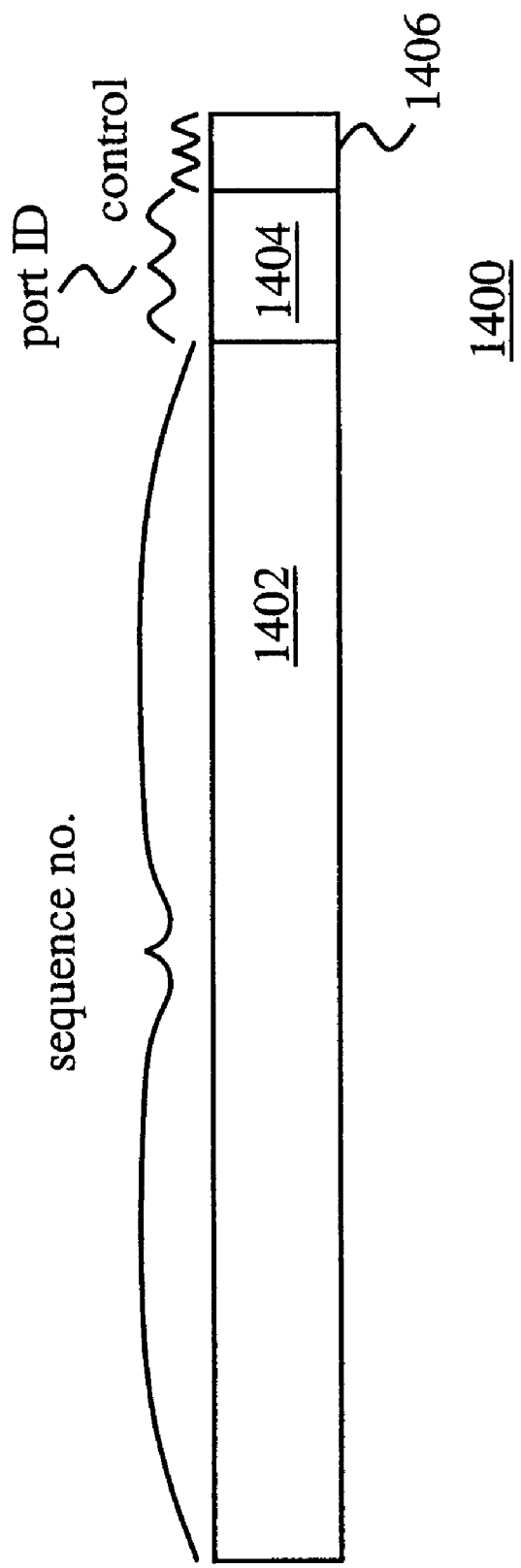
FIG. 14 illustrates a sequence number header for appending to data stream sections.

From the state 1304, program flow moves to a state 1306. In the state 1306, a first section is separated from the remainder of the incoming stream. For example, the I/F device 608 (FIG. 6) may break the incoming stream into 68-byte-long sections. Then, in a state 1308, a sequence number is assigned to the first section. FIG. 14 illustrates a sequence number header 1400 for appending a sequence number to data stream sections. As shown in FIG. 14, the header includes a sequence number 1402, a source port identification 1404 and a control field 1406. The sequence number 1402 is preferably twenty bits long and is used to keep track of the order in which data stream sections are received. The source port identification 1404 is preferably eight bits long and may be utilized to ensure that the data stream sections are prioritized appropriately, as explained in more detail herein. The control field 1406 may be used to indicate a burst type for the section (e.g., start burst, continue burst, end of burst or data message). The header 1400 may also be appended to the first data stream section in the state 1308.

From the state 1308, program flow moves to a state 1310. In the state 1310, a label-switching header may be appended to the section. For example, the data stream section may be formatted to include a slot-mask, burst type and CID as shown in FIG. 8. In addition, the data section is forwarded to the queuing engines 616 (FIG. 6) for further processing.

From the state 1310, program flow may follow two threads. The first thread leads to a state 1312 where a determination is made as to whether the end of the data stream has been reached. If not, program flow returns to the 1306 where a next section of the data stream is handled. This process (i.e. states 1306, 1308, 1310 and 1312) repeats until the end of the stream is reached. Once the end of the stream is reached, the first thread terminates in a state 1314.

Figure 15:
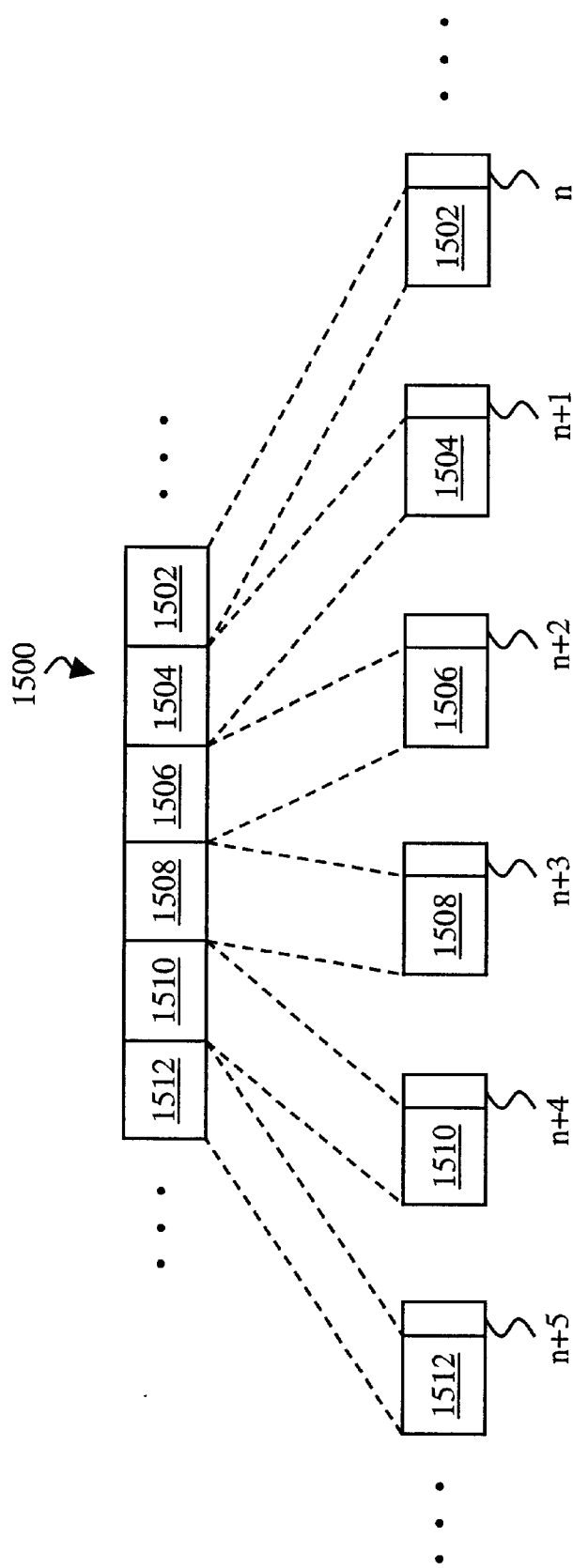
FIG. 15 illustrates a sequence of data stream sections and appended sequence numbers.

FIG. 15 illustrates a data stream 1500 broken into sequence sections 1502–1512 in accordance with the present invention. In addition, sequence numbers are appended to each section 1502–1512. More particularly, a sequence number (n) is appended to a section 1502 of the sequence 1500. The sequence number is then incremented to (n+1) and appended to a next section 1504. As explained above, this process continues until all of the sections of the stream 1500 have been appended with sequence numbers that allow the data stream 1500 reconstructed should the sections fall out of order on their way through the network equipment, such as the switch 600 (FIG. 6)

Referring again to FIG. 13, the second program thread leads from the state 1310 to a state 1316. In the state 1316, the outgoing section (that was sent to the queuing engines 616 in the state 1310) is received into the appropriate output port for the data stream from the queuing engines 616. Then, program flow moves to a state 1318 where the label added in the state 1310 is removed along with the sequence number added in the state 1308. From the state 1318 program flow moves to a state 1320 where the data stream sections are reassembled in the original order based upon their respective sequence numbers. This may occur, for example, in the output path of the I/F device 608 (FIG. 6) of the output port for the data stream. Then, the data stream is reformatted and communicated to the network 100 where it travels along a next link in its associated LSP.

Note that earlier portions of the data stream may be transmitting from an output port (in state 1320) at the same time that later portions are still being received at the input port (state 1306). Further, to synchronize a recipient to the data stream, timing features included in the received data stream are preferably reproduced upon re-transmission of the data. In a further aspect, since TDM systems do not idle, but rather continuously send data, idle codes may be sent using this store and forward technique to keep the transmission of data constant at the destination. This has an advantage of keeping the data communication session active by providing idle codes, as expected by an external destination.

Once the entire stream has been forwarded or the connection taken down, the second thread terminates in the state 1314. Thus, a technique has been described that effectively provides a cut-through mechanism for data streams using a store-and-forward switch architecture.

It will be apparent from the foregoing description that the network system of the present invention provides a novel degree of flexibility in forwarding data of various different types and formats. To further exploit this ability, a number of different communication services are provided and integrated. In a preferred embodiment, the same network equipment and communication media described herein is utilized for all provided services. During transmission of data, the CIDs are utilized to identify the service that is utilized for the data.

A first type of service is for continuous, fixed-bandwidth data streams. For example, this may include communication sessions for TDM, telephony or video data streaming. For such data streams, the necessary bandwidth in the network 100 is preferably reserved prior to commencing such a communication session. This may be accomplished by reserving channels within the SONET frame structure 400 (FIG. 4) that are to be transmitted along LSPs that link the end points for such transmissions. User entities may subscribe to this type of service by specifying their bandwidth requirements between various locations of the network 100 (FIG. 1). In a preferred embodiment, such user entities pay for these services in accordance with their requirements.

This TDM service described above may be implemented using the data stream cut-through technique described herein. Network management facilities distributed throughout the network 100 may be used ensure that bandwidth is appropriately reserved and made available for such transmissions.

A second type of services is for data that is latency-tolerant. For example, this may include packet-switched data, such as Ethernet and TCP/IP. This service may be referred to as best efforts service. This type of data may require handshaking and the resending of data in event packets are missed or dropped. Control of best efforts communications may be with the distributed network management services, for example, for setting up LSPs and routing traffic so as to balance traffic loads throughout the network 100 (FIG. 1) and to avoid failed equipment. In addition, for individual network devices, such as the switch 600, the schedulers 620 and master scheduler 622 preferably control the scheduling of packet forwarding by the switch 600 according to appropriate priority schemes.

A third type of services is for constant bit rate (CBR) transmissions. This service is similar to the reserved bandwidth service described above in that CBR bandwidth requirements are generally constant and are preferably reserved ahead-of-time. However, rather than dominating entire transmission channels, as in the TDM service, multiple CBR transmissions may be multiplexed into a single channel. Statistical multiplexing may be utilized for this purpose. Multiplexing of CBR channels may be accomplished at individual devices within the network 100 (FIG. 1), such as the switch 600 (FIG. 6), under control of its CPU subsystem 636 (FIG. 6) and other elements.

Thus, using a combination of Time Division Multiplexing (TDM) and packet switching, the system may be configured to guarantee a predefined bandwidth for a user entity, which, in turn, helps manage delay and jitter in the data transmission. Ingress processors 610 (FIG. 6) may operates as bandwidth filters, transmitting packet bursts to distribution channels for queuing in a queuing engine 616 (FIG. 6). For example, the ingress processor 610 may apply backpressure to the media 602 (FIG. 6) to limit incoming data to a predefined bandwidth assigned to a user entity. The queuing engine 616 holds the data packets for subsequent scheduled transmission over the network, which is governed by predetermined priorities. These priorities may be established by several factors including pre-allocated bandwidth, system conditions and other factors. The schedulers 620 and 622 (FIG. 6) then transmit the data.

Thus, a network system has been described that includes a number of advantageous and novel features for communicating data of different types and formats.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of forwarding data packets in a multi-port switch having input ports for receiving data packets to be forwarded by the switch and output ports for forwarding the data packets, comprising steps of:

receiving a data packet by an input port;

passing copies of the data packet to each of a plurality of output ports including at least one output port that is not an appropriate output port for forwarding the packet;

forming one or more masks for the packet, each mask being a binary value having a first logic value in each bit position that corresponds to appropriate output port for forwarding the packet and a second logic value in remaining bit positions; and forwarding the data packet by each appropriate output port indicated by the one or more masks.

2. The method according to claim 1, wherein the mask for a uni-cast packet has the first logic value in a bit position that corresponds to one appropriate output port for forwarding the packet and a second logic value in the remaining bit positions.

3. The method according to claim 1, wherein the mask for a multi-cast packet has the first logic value in bit positions that correspond to a plurality of appropriate output ports for forwarding the packet and the second logic value in the remaining bit positions.

4. The method according to claim 1, further comprising dropping the copy of the data packet by each of the plurality of output ports that is not an appropriate output port for forwarding the data packet after said passing.

5. The method according to claim 1, wherein said forwarding includes forwarding the data packet by multiple output ports in substantially the same format.

6. The method according to claim 1, wherein said forming comprises forming a plurality of said masks.

7. The method according to claim 6, wherein said forwarding includes forwarding the data packet in a different format for each of multiple output ports.

8. The method according to claim 1, wherein the mask is included in a destination vector for the packet, wherein the destination vector indicates whether the packet is to be forwarded according to multiple different formats.

9. The method according to claim 1, further comprising looking up the destination vector in a look-up table of the multi-port switch.

10. The method according to claim 1, further comprising forming a command packet when the data packet is to be forwarded according to multiple different formats.

11. The method according to claim 10, wherein the command packet includes indicia of the format for the data packet for each appropriate output port for forwarding the data packet.

12. The method according to claim 10, wherein the command packet includes the one or more masks for the packet.

13. The method according to claim 10, wherein the command packet includes an additional mask having the first logic value in all bit positions.

14. A method of forwarding data packets in a multi-port switch having input ports for receiving data packets to be forwarded by the switch and output ports for forwarding the data packets, comprising steps of:

receiving a data packet by an input port;

passing copies of the data packet to each of a plurality of output ports including at least one output port that is not an appropriate output port for forwarding the packet; and determining whether the data packet is multi-cast or uni-cast and when the packet is uni-cast, forming a uni-cast mask for the packet, the uni-cast mask being a binary value having first logic value in a bit position that corresponds to an appropriate output port for forwarding the packet and a second logic value in remaining bit positions and when the packet is multi-cast, forming a plurality of multi-cast masks for the packet, each multi-cast mask being a binary value having the first logic value in a bit position that corresponds to an appropriate output port for forwarding the packet.

15. The method according to claim 14, further comprising forwarding the data packet by the destination ports indicated by the one of the uni-cast or multi-cast masks.

16. The method according to claim 14, further comprising dropping the copy of the data packet by each of the plurality of output ports that is not an appropriate output port for forwarding the data packet after said passing.

17. The method according to claim 14, wherein when the data packet is multi-cast, performing steps of:

determining an appropriate format of the data packet for each multi-cast mask;

formatting the data packet in accordance with each of the appropriate formats thereby forming a plurality of formatted multi-cast packets; and forwarding the formatted multi-cast packets.

18. The method according to claim 17, wherein said determining includes forming a multi-cast identification list having a number of entries corresponding to the number of output ports that are to forward the data packet, each entry including an identification of a output port and an indication of an appropriate format for the data packet.

19. The method according to claim 18, further comprising forming the multi-cast masks based on the output port identifications.

20. A method of forwarding data packets in a multi-port switch having input ports for receiving data packets to be forwarded by the switch and output ports for forwarding the data packets, comprising steps of:

receiving a data packet by an input port;

passing copies of the data packet to each of a plurality of output ports;

forming one or more masks for the packet, each mask being a binary value having a first logic value in one or more bit positions that correspond to appropriate output ports for forwarding the packet and a second logic value in the remaining bit positions;

determining an appropriate format of the data packet for each of the appropriate output ports;

formatting the data packet in accordance with each of the appropriate formats thereby forming a plurality of formatted multi-cast packets;

forwarding the formatted multi-cast packets; and dropping the copy of the data packet by each output port that is not an appropriate output port for forwarding the data packet after said passing.

21. A method of forwarding data packets in a multi-port switch having input ports for receiving data packets to be forwarded by the switch and output ports for forwarding the data packets, comprising steps of:

receiving a data packet by an input port;

forming a first mask when the packet is multi-cast, the first mask being a binary value having a first logic value in all bit positions;

passing copies of the data packet to each output port indicated by the first mask, including at least one output port that is not an appropriate output port for forwarding the packet;

forming one or more multi-cast masks for the packet, each multi-cast mask being a binary value having a first logic value in each bit position that corresponds to appropriate output port for forwarding the packet and a second logic value in remaining bit positions; and forwarding the data packet by each appropriate output port indicated by the one or more multi-cast masks.

22. The method according to 21, further comprising determining whether the packet is uni-cast or multi-cast, and when the packet is uni-cast, forming a uni-cast mask, the uni-cast mask being a binary value having a first logic value each bit position that corresponds to appropriate output port for forwarding the packet.

23. The method according to claim 22, wherein the uni-cast mask has one occurrence of the first logic value.

24. The method according to claim 22, wherein the uni-cast mask has a plurality of occurrences of the first logic value.

25. The method according to claim 22, further comprising appending the uni-cast mask to the packet.

26. The method according to claim 21, further comprising appending the first mask to the data packet.

* * * * *